(12) United States Patent
Kasaya et al.

(10) Patent No.: US 10,802,173 B2
(45) Date of Patent: Oct. 13, 2020

(54) RESOURCE ESTIMATION SYSTEM AND RESOURCE ESTIMATION METHOD

(71) Applicant: Japan Agency for Marine-Earth Science and Technology, Kanagawa (JP)

(72) Inventors: Takafumi Kasaya, Yokosuka (JP); Yoshifumi Kawada, Yokosuka (JP); Tadanori Goto, Yokosuka (JP)

(73) Assignee: Japan Agency for Marine-Earth Science and Technology, Kanagawa (JP)

( * ) Notice: Subject to any disclaimer, the term of this patent is extended or adjusted under 35 U.S.C. 154(b) by 364 days.

(21) Appl. No.: 15/745,861

(22) PCT Filed: Oct. 27, 2016

(86) PCT No.: PCT/JP2016/081915
§ 371 (c)(1),
(2) Date: Jan. 18, 2018

(87) PCT Pub. No.: WO2017/134877
PCT Pub. Date: Aug. 10, 2017

(65) Prior Publication Data
US 2018/0210106 A1    Jul. 26, 2018

(30) Foreign Application Priority Data
Feb. 5, 2016  (JP) .................................. 2016-020642

(51) Int. Cl.
*G01V 3/02* (2006.01)
*G01V 3/08* (2006.01)
(Continued)

(52) U.S. Cl.
CPC .............. *G01V 3/165* (2013.01); *G01V 3/082* (2013.01); *G01V 3/38* (2013.01); *Y02A 90/30* (2018.01)

(58) Field of Classification Search
CPC . G01V 3/02; G01V 3/08; G01V 3/083; G01V 3/12; G01V 3/165; G01V 3/38;
(Continued)

(56) References Cited

U.S. PATENT DOCUMENTS

2006/0232259 A1    10/2006  Olsson et al.
2009/0290447 A1*   11/2009  Vigen .................. G01V 1/3835
                                                    367/19
(Continued)

FOREIGN PATENT DOCUMENTS

CN    101116010 A    1/2008
CN    103744002 A    4/2014
(Continued)

OTHER PUBLICATIONS

Extended European Search Report issued by the European Patent Office dated Sep. 20, 2019, which corresponds to EP16889360.0-1003 and is related to U.S. Appl. No. 15/745,861.
(Continued)

*Primary Examiner* — Neel D Shah
(74) *Attorney, Agent, or Firm* — Studebaker & Brackett PC

(57) ABSTRACT

Exploration of resources of the bottom of water such as a seafloor based on a self-potential is accurately performed. A computer of a resource estimation system includes an estimation information acquisition unit that acquires potential information indicating potentials of a plurality of potential electrodes having a predetermined positional relationship measured at a plurality of positions in water, a noise removal unit that removes noise contained in the measured potentials
(Continued)

by performing principal component analysis or independent component analysis using the potentials, and a resource estimation unit that estimates the presence of the resources in the bottom of water based on the potential from which the noise has been removed.

10 Claims, 15 Drawing Sheets

(51) Int. Cl.
*G01V 1/36* (2006.01)
*G01R 19/00* (2006.01)
*G06F 17/50* (2006.01)
*G01V 3/165* (2006.01)
*G01V 3/38* (2006.01)

(58) Field of Classification Search
CPC . G01V 1/36; G01V 1/38; G01R 19/00; G06F 17/50
See application file for complete search history.

(56) References Cited

U.S. PATENT DOCUMENTS

| | | |
|---|---|---|
| 2013/0162256 A1 | 6/2013 | Hobbs |
| 2013/0185033 A1* | 7/2013 | Tompkins ............... G01V 11/00 703/2 |
| 2015/0006081 A1* | 1/2015 | Versteeg .................. G01V 3/38 702/7 |

FOREIGN PATENT DOCUMENTS

| | | |
|---|---|---|
| JP | S60135783 A | 7/1985 |
| JP | 2008-148797 A | 7/2008 |
| JP | 2008-295010 A | 12/2008 |
| JP | 2009-110262 A | 5/2009 |
| JP | 2011-081293 A | 4/2011 |
| JP | 2011-232812 A | 11/2011 |
| JP | 2014-130512 A | 7/2014 |

OTHER PUBLICATIONS

An Office Action mailed by the State Intellectual Property Office of the People's Republic of China dated Nov. 20, 2018, which corresponds to Chinese Patent Application No. 201680042294.1 and is related to U.S. Appl. No. 15/745,861; with English translation.
An Office Action mailed by the Japanese Patent Office dated Nov. 20, 2018, which corresponds to Japanese Patent Application No. 2016-020642 and is related to U.S. Appl. No. 15/745,861; with English translation.
International Search Report issued in PCT/JP2016/081915; dated Jan. 31, 2017.
Graham Heinson et al.; "Marine Self-Potential Gradient Exploration of the Continental Margin"; Geophysics; Sep.-Oct. 2005; pp. G109-G118; vol. 70, No. 5.
International Preliminary Report on Patentability issued in corresponding International Application No. PCT/JP2016/081915; dated Aug. 16, 2018.
An Office Action mailed by the Japanese Patent Office dated Jan. 29, 2019, which corresponds to Japanese Patent Application No. 2016-020642 and is related to U.S. Appl. No. 15/745,861.
An Office Action mailed by the Japanese Patent Office dated Feb. 25, 2020, which corresponds to Japanese Patent No. 2019-054714 and is related to U.S. Appl. No. 15/745,861 with English language translation.

* cited by examiner

RESOURCE ESTIMATION SYSTEM AND RESOURCE ESTIMATION METHOD

TECHNICAL FIELD

The present invention relates to a resource estimation system and a resource estimation method of estimating the presence of resources in the bottom of water such as the seafloor.

BACKGROUND ART

In the related art, measuring a self-potential in the sea and exploring resources in the seafloor based on the measured self-potential has been proposed (see, for example, Non-Patent Document 1).

CITATION LIST

Non Patent Literature

[Non-Patent Document 1] Heinson, G, White, A., Robinson, D. and Fathianpour, N., Marine self-potential gradient exploration of the continental margin Geophysics, 70: G109-G118 (2005)

SUMMARY OF INVENTION

Technical Problem

A potential measured in the sea contains various noises. For example, in order to measure a self-potential in the sea, it is usually necessary to move electrodes in the sea using an underwater vehicle (for example, an autonomous underwater vehicle (AUV) or a remotely operated vehicle (ROV)) or the like. Therefore, noises such as a noise generated by movement of the electrodes in the sea or a noise generated by the underwater vehicle on which a measurement device is mounted, or the like are generated. A self-potential in the sea due to resources in the seafloor is not sufficiently higher than such noises. Therefore, it is difficult to accurately explore the resources in the seafloor based on the measured potential.

The present invention has been made in view of the above, and an object of the present invention is to provide a resource estimation system and a resource estimation method capable of accurately performing exploration of resources in the bottom of water such as the seafloor based on a self-potential.

Solution to Problem

In order to achieve the above object, a resource estimation system according to an embodiment of the present invention includes potential information acquisition means for acquiring potential information indicating potentials of a plurality of electrodes having a predetermined positional relationship measured at a plurality of positions in water; noise removal means for performing principal component analysis or independent component analysis using the potentials of the plurality of electrodes indicated by the potential information acquired by the potential information acquisition means to remove a noise contained in the measured potentials; and resource estimation means for estimating the presence of resources in the bottom of water based on the potential from which the noise has been removed by the noise removal means.

In the resource estimation system according to the embodiment of the present invention, the principal component analysis or the independent component analysis is performed using the potentials of the plurality of electrodes having a predetermined positional relationship, a noise contained in the potential is removed, and the presence of resources in the bottom of water is estimated. Thus, it is possible to separate the potential of the noise (in a near field) relatively close to the electrode from the potential from the resources in the bottom of water relatively distant (in a far field) from the electrode by performing the principal component analysis or the independent component analysis using the potentials of a plurality of electrodes. Thereby, according to the embodiment of the present invention, it is possible to accurately perform exploration of resources in the bottom of water such as the seafloor based on a self-potential.

The noise removal means may perform extraction of a separation component of a signal related to the resources or exclusion of separation components of the noise from separation components obtained by performing the principal component analysis or the independent component analysis based on a contribution rate or the amount of component load of the separation component obtained by the principal component analysis or the independent component analysis, and perform reconstruction of values of the separation components to calculate the potential from which the noise has been removed. More specifically, the noise removal means may determine the separation component of the noise in descending order of the contribution rate or an absolute value of the amount of component load. Alternatively, the noise removal means may determine the separation component of the signal related to the resources in ascending order of the contribution rate or an absolute value of the amount of component load. According to this configuration, it is possible to accurately perform exploration of resources in the bottom of water such as the seafloor or the like based on the self-potential appropriately and reliably.

The potential information acquisition means may acquire potential information for calibration and potential information for estimation of resources, and the noise removal means may perform extraction of the separation component of the signal related to the resources or exclusion of the separation component of the noise based on the potential information for calibration, and perform reconstruction of a value of the separation component based on the potential information for estimation of resources. According to this configuration, the noise can be removed more appropriately, and exploration of the resources in the bottom of water can be performed more accurately.

The resource estimation system may further include environmental information acquisition means for acquiring environmental information indicating an environment at a plurality of positions in the water, and the noise removal means may remove the noise based also on the environmental information acquired by the environmental information acquisition means. According to this configuration, the noise can be removed while reliably considering the underwater environment, and exploration of resources in the bottom of water can be performed more accurately.

The resource estimation system may further include the plurality of electrodes; and potential measurement means for measuring the potential of the electrode at a plurality of positions in water and inputting potential information indicating the measured potential to the potential information acquisition means. According to this configuration, an embodiment of the present invention can be implemented more reliably.

The resource estimation system may further include a moving body that moves in water, and the plurality of electrodes may be arranged at different positions of the moving body. According to this configuration, for example, the electrodes can be arranged at different positions in a number of directions such as a horizontal direction and a vertical direction. That is, the electrodes can be three-dimensionally arranged. Thereby, it is possible to arrange the electrodes so that it is easy to detect the noise and to perform exploration of the resources in the bottom of water more accurately.

The resource estimation system may further include moving body information acquisition means for acquiring moving body information indicating a state of a moving body to which a plurality of electrodes are connected and that moves in the water at a plurality of positions in the water, and the noise removal means may remove the noise based also on the moving body information acquired by the moving body information acquisition means. According to this configuration, it is possible to remove noise while reliably considering the state of the moving body, and to perform exploration of the resources in the bottom of water more accurately.

Incidentally, the present invention can be described not only as an invention of the resource estimation system as described above, but also as an invention of a resource estimation method as follows. These are substantially the same invention except for the categories and have the same operation and effects.

That is, the resource estimation method according to an embodiment of the present invention is a resource estimation method in an operation method of a resource estimation system, the resource estimation method including: a potential information acquisition step of acquiring potential information indicating potentials of a plurality of electrodes having a predetermined positional relationship measured at a plurality of positions in water; a noise removal step of performing principal component analysis or independent component analysis using the potentials of the plurality of electrodes indicated by the potential information acquired in the potential information acquisition step to remove noise contained in the measured potentials; and a resource estimation step of estimating the presence of resources in the water based on the potential from which the noise has been removed in the noise removal step.

The resource estimation method may further include a movement step of moving the electrodes at a constant water depth. According to this configuration, it is possible to easily move the electrodes in the water, and to easily implement an embodiment of the present invention.

Advantageous Effects of Invention

According to the embodiment of the present invention, it is possible to separate the potential of the noise (in a near field) relatively close to the electrode from the potential from the resources in the bottom of water relatively distant (in a far field) from the electrode by performing the principal component analysis or the independent component analysis using the potentials of a plurality of electrodes. Thereby, according to the embodiment of the present invention, it is possible to accurately perform exploration of resources in the bottom of water such as the seafloor based on a self-potential.

DESCRIPTION OF EMBODIMENTS

Figure 1:
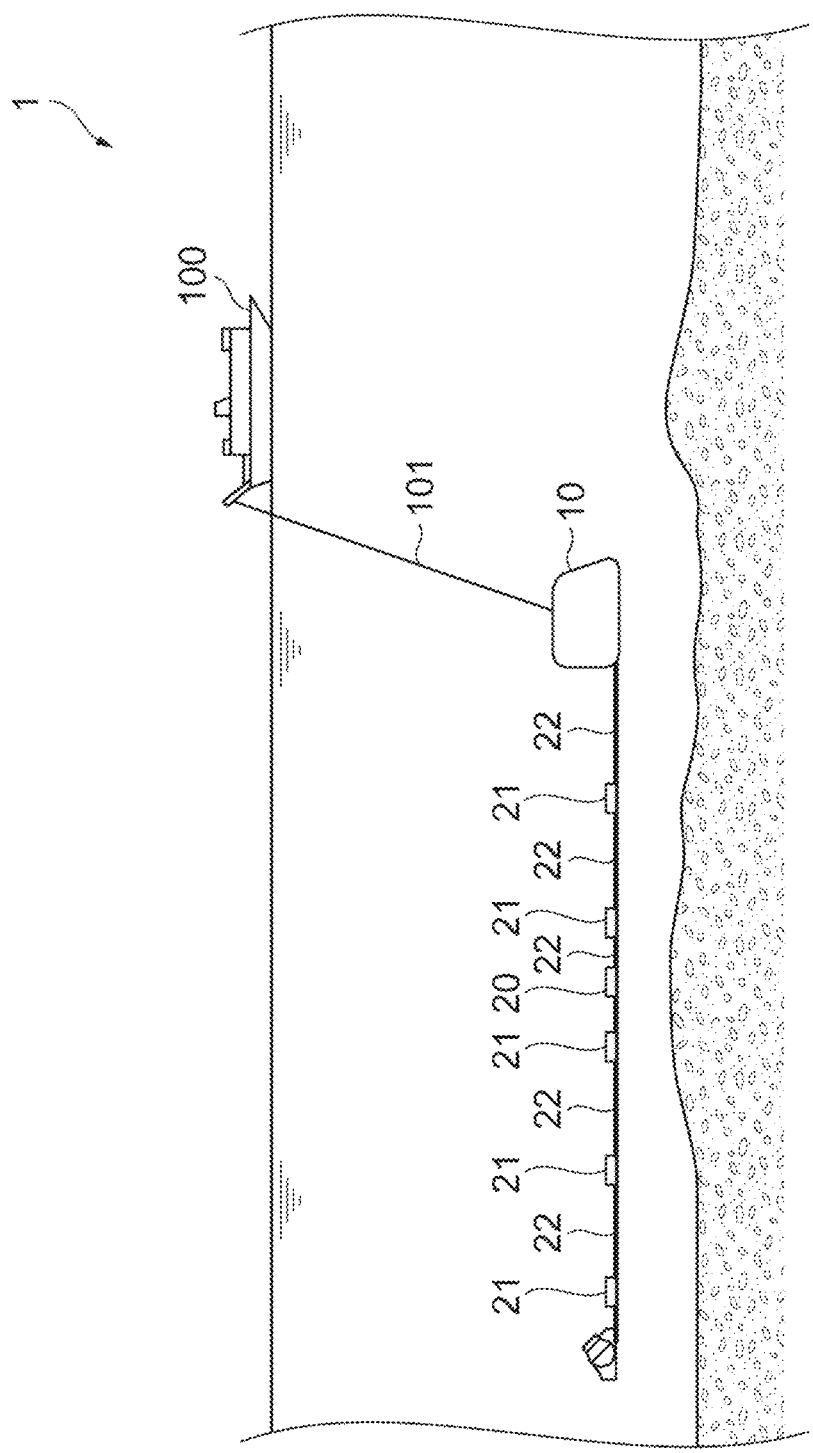
FIG. 1 is a diagram schematically illustrating a resource estimation system according to an embodiment of the present invention.

Hereinafter, embodiments of a resource estimation system and a resource estimation method according to the present invention will be described in detail with reference to the drawings. In the description of the drawings, the same elements are denoted with the same reference numerals, and repeated description will be omitted. Further, dimensional ratios of the drawings do not necessarily match those that will be described.

FIG. 1 schematically illustrates a resource estimation system 1 according to this embodiment. The resource estimation system 1 is a system that estimates the presence of resources in the bottom of water. Although resources under the seafloor will be described by way of example in the embodiment, the resources are not necessarily resources under the seafloor and need only be resources in the bottom of water (for example, the bottom of a lake or river). Normally, since resources are located under the seafloor (under the bottom of water, that is, underground) including the seafloor (the bottom of water), the seafloor (the bottom of water) referred to herein may also include the area under the seafloor (under the bottom of water, that is, underground). Resources of which the presence is estimated by the resource estimation system 1 are primarily mineral resources (for example, a submarine hydrothermal deposit, or an ore body). Further, natural resources other than the mineral resources (for example, petroleum or natural gas) may be an estimation target. Resources under the seafloor generate an electric field in the sea. That is, the resources under the seafloor have an influence on a potential in the sea. The resource estimation system 1 measures the potential (self-potential) in the sea and estimates at which portion under the seafloor the resources are present.

As illustrated in FIG. 1, the resource estimation system 1 includes a moving body 10 and a plurality of electrodes 20 and 21 (an electrode array). The moving body 10 is a device that moves in the sea. For example, the moving body 10 is connected to a ship 100 by a cable 101. For example, the moving body 10 is an underwater vehicle such as an AUV that autonomously navigates in the sea or an ROV. Alternatively, the moving body 10 may be a device that is towed by the ship 100. The plurality of electrodes 20 and 21 are connected to the moving body 10. The plurality of electrodes 20 and 21 are intended to measure the potential in the sea. According to the movement of the moving body 10, the electrodes 20 and 21 also move in the sea, and the potential is measured at a plurality of positions in the sea. Estimation of resources under the seafloor is performed based on the potential measured using the electrodes 20 and 21.

In the resource estimation system 1 according to the embodiment, it is possible to perform resource exploration in a deep sea area exceeding a water depth of 1000 m. For example, the moving body 10 and the electrodes 20 and 21 move (or are moved) in the sea at an altitude of about tens of meters from the seafloor. The moving body 10 and the electrodes 20 and 21 may move while maintaining a constant altitude from the seafloor or move at a substantially constant water depth (while maintaining a constant water depth from the sea surface).

A plurality of noises such as a noise generated by movement of the electrodes 20 and 21 in the sea or vibration according to a behavior of the moving body 10 or a noise generated by the moving body 10 itself having a measurement system mounted thereon may be included in the potential that is measured using the electrodes 20 and 21. Since the noises are not necessarily noises at a specific frequency, it is difficult to separate and remove noises with a simple frequency filter or the like.

The potential (a signal regarding resources) that is used for estimation of resources is usually caused by resources below the seafloor at a position (far field) relatively far from the electrodes 20 and 21. On the other hand, the above noises occur in a relatively local field (near the measurement system; near field). In the embodiment, the signal and the noise are separated and the estimation of the resources is performed.

Figure 2:
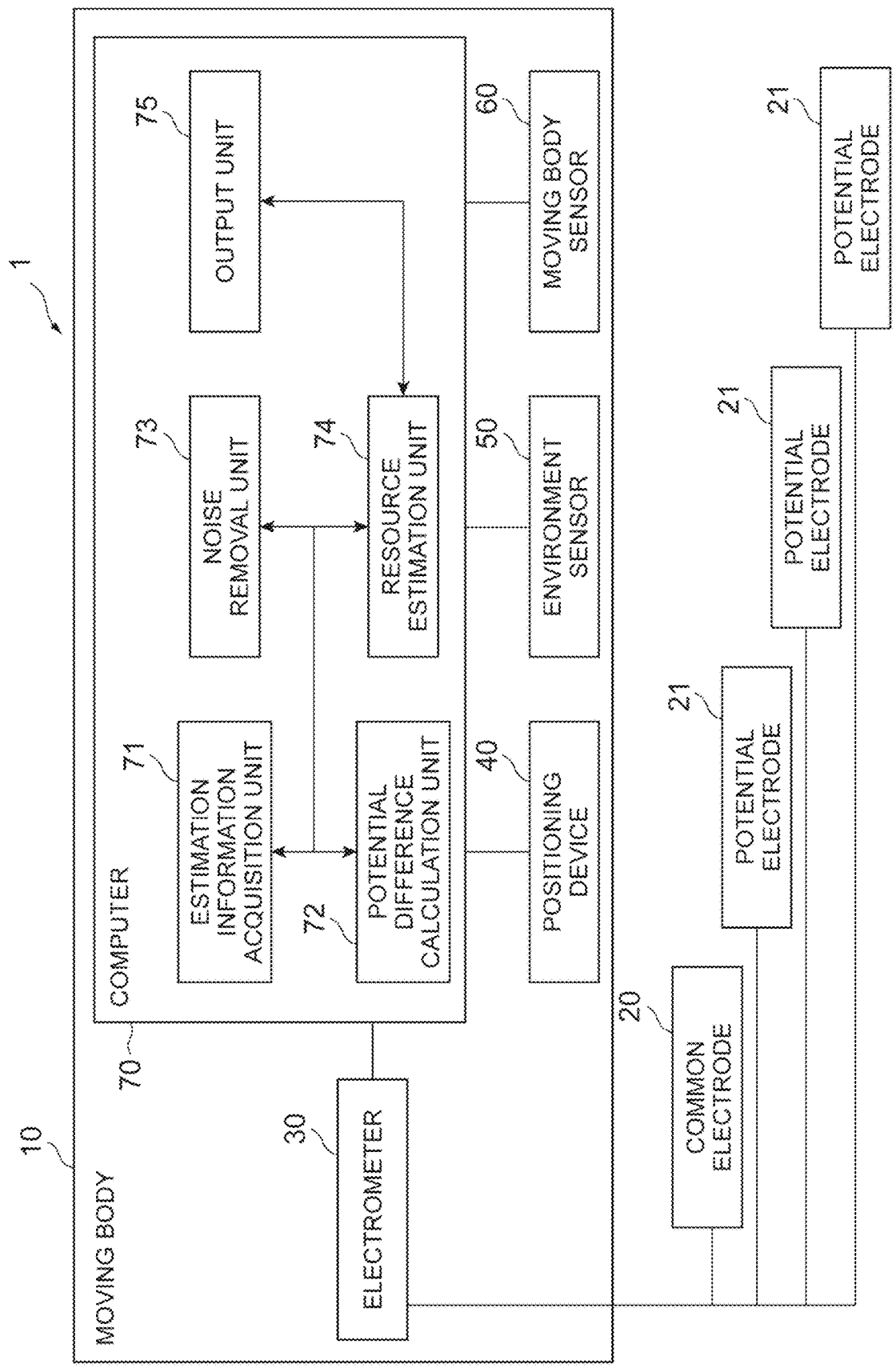
FIG. 2 is a diagram illustrating a configuration of a resource estimation system according to an embodiment of the present invention.

FIG. 2 illustrates a functional configuration of the resource estimation system 1 according to this embodiment. As illustrated in FIG. 2, a plurality of electrodes 20 and 21 are connected to the moving body 10. One of the plurality of electrodes 20 and 21 is a common electrode (ground electrode) 20. The common electrode 20 is an electrode for measuring a potential serving as a reference potential. The rest of the plurality of electrodes 20 and 21 are potential electrodes 21. The potential electrodes 21 are electrodes for measuring a potential that is used for estimation of resources. The resource estimation system 1 includes the plurality of potential electrodes 21. For example, about five potential electrodes 21 are included, as illustrated in FIG. 1.

The respective electrodes 20 and 21 are provided at different positions with a predetermined positional relationship. For example, as illustrated in FIG. 1, the respective electrodes 20 and 21 are sequentially connected by an electrode rod 22 which is a bar-shaped member made of fiber reinforced plastic (FRP), a thermoplastic resin (for example, polypropylene (PP)), or the like. An interval between the potential electrodes 21 is several meters (for example, 5 m). Further, an interval between the moving body 10 and the potential electrode 21 closest to the moving body 10 is set to several meters (for example, 6 m). The common electrode 20 is provided, for example, between a second potential electrode 21 and a third potential electrode 21 from the moving body 10. As each of the electrodes 20 and 21, a non-polarized electrode in the related art that is used to measure the potential in the sea is used.

As illustrated in FIG. 2, the moving body 10 includes an electrometer 30, a positioning device 40, an environment sensor 50, a moving body sensor 60, and a computer 70. Each of the devices 30, 40, 50, and 60 other than the computer 70 is connected to the computer 70 so that information can be transmitted to the computer 70. Further, the moving body 10 has a configuration for moving in the sea (not illustrated). The configuration for moving in the sea may be similar to that of a device in the related art (for example, an AUV or an ROY).

The electrometer 30 is a device which is potential measurement means for measuring a potential of each potential electrode 21 (each channel) with reference to a potential of the common electrode 20. The electrometer 30 continuously measures the potential of each potential electrode 21. For example, the electrometer 30 measures the potential of each potential electrode 21 at a sampling rate of about 20 to 50 Hz. Since the moving body 10 and the electrodes 20 and 21 move in water as described above, the potentials of the respective potential electrodes 21 at a plurality of positions in water are measured by continuous measurement. As the electrometer 30, an electrometer in the related art can be used and can be arranged in the moving body 10, similar to the electrometer in the related art. The electrometer 30 outputs potential information indicating the measured potential to the computer 70.

The positioning device 40 is a device that measures a position of the moving body 10. The positioning device 40 continuously performs position measurement of the moving body 10. The position of the moving body 10 obtained by the position measurement is obtained as information of latitude and longitude, for example. As the positioning device 40, a positioning device in the related art can be used and can be arranged in the moving body 10, similar to a positioning device for the sea in the related art. The positioning device 40 outputs position information indicating the position of the moving body 10 obtained by the position measurement to the computer 70. The position information output to the computer 70 is associated with the potential information as information indicating a position at which the potential measured by the electrometer 30 is measured, based on, for example, a timing of position measurement. The positioning device 40 is not necessarily built in a casing of the moving body 10, and may be connected to, for example, the moving body 10 with a rod-shaped member, similar to the electrodes 20 and 21.

The environment sensor 50 is a device that is means for detecting an underwater environment (an environment around the moving body 10). The environment detected by the environment sensor 50 is, for example, an electric conductivity of water, a temperature, a salinity concentration, or a water depth (altitude). The environment sensor 50 may detect one piece of information among the above information or may detect a plurality of pieces of information among the information. The environment sensor 50 continuously detects the underwater environment and detects the environment at a plurality of positions in the water. An environment sensor (for example, a conductivity temperature depth profiler (CTD)) in the related art is used as the environment sensor 50, which can be arranged in the moving body 10, similar to the environment sensor in the related art. The environment sensor 50 outputs environmental information indicating the detected environment to the computer 70. The environmental information output to the computer 70 is associated with the potential information on the potential measured by the electrometer 30 at the same position based on a detection timing or the like.

The moving body sensor 60 is a device which is means for detecting a state of the moving body 10. The state of the moving body 10 detected by the moving body sensor 60 is, for example, vibration (specifically, a pitch angle, a roll angle, an azimuth, or the like) of the moving body. The moving body sensor 60 may detect one piece of information among the above information or may detect a plurality of pieces of information among the information. The moving body sensor 60 continuously detects the state of the moving body 10 and detects the state of the moving body 10 at a plurality of positions in the water. As the moving body sensor 60, a moving body sensor in the related art can be used, and can be arranged in the moving body 10, similar to the moving body sensor in the related art. The moving body sensor 60 outputs moving body information indicating the detected state of the moving body 10 to the computer 70. The moving body information output to the computer 70 is associated with the potential information on the potential measured by the electrometer 30 at the same position based on the detection timing or the like.

The measurement by the electrometer 30, the detection by the environment sensor 50, and the detection by the moving body sensor 60 are performed in two steps of calibration and resource estimation, as will be described below. On the other hand, the position measurement by the positioning device 40 may be performed only in a step of resource estimation. Specifically, a timing of the processes may be set in advance, or may be triggered by an operation or the like of an operator of the resource estimation system 1.

The computer 70 is a device which performs calculation for estimating the presence of resources based on the information input from the devices 30, 40, 50, and 60. The computer 70 includes hardware such as a central processing unit (CPU) and a memory. By operating this hardware with a program or the like, a function of the computer 70 to be described below is performed. As the computer 70, a computer in the related art may be used.

As illustrated in FIG. 2, the computer 70 functionally includes an estimation information acquisition unit 71, a potential difference calculation unit 72, a noise removal unit 73, a resource estimation unit 74, and an output unit 75.

The estimation information acquisition unit 71 is means for acquiring information that is used for estimation of resources from each of the devices 30, 40, 50, and 60 included in the moving body. Specifically, the estimation information acquisition unit 71 is potential information acquisition means for inputting and acquiring potential information from the electrometer 30. The estimation information acquisition unit 71 outputs the acquired potential information to the potential difference calculation unit 72. The estimation information acquisition unit 71 may calculate an electric field (V/m) by dividing a potential (V) indicated by the potential information input from the electrometer 30 by a distance between the common electrode 20 and each potential electrode 21, and the electric field data may be used in subsequent processes. In this case, in the following description, the potential may be interpreted as the electric field. As described above, the distance between the common electrode 20 and each of the potential electrodes 21 is determined in advance, and the estimation information acquisition unit 71 stores the distance for each potential electrode 21.

Further, the estimation information acquisition unit 71 is environmental information acquisition means for inputting and acquiring the environmental information from the environment sensor 50. The estimation information acquisition unit 71 outputs the acquired environmental information to the noise removal unit 73. Further, the estimation information acquisition unit 71 is moving body information acquisition means for inputting and acquiring the moving body information from the moving body sensor 60. The estimation information acquisition unit 71 outputs the acquired moving body information to the noise removal unit 73. The estimation information acquisition unit 71 inputs and acquires the position information from the positioning device 40. The estimation information acquisition unit 71 outputs the acquired position information to the resource estimation unit 74.

The potential difference calculation unit 72 is potential difference calculation means for calculating a potential difference between potentials of a pair (combination) of potential electrodes 21 at the plurality of positions for measurement for the potentials of the potential electrodes 21 indicated by the potential information input from the estimation information acquisition unit 71, for a plurality of pairs. The pair of potential electrodes 21 between which the potential difference is calculated is preset. For example, when the potential electrodes 21 are sequentially connected as illustrated in FIG. 1, if the potential electrodes 21 are ch1, ch2, ch3, ch4, and ch5 from the side closer to the moving body 10, four pairs including a pair ch2-ch1, a pair ch1-ch2, a pair ch4-ch3, and a pair ch5-ch4 can be set.

Figure 3:
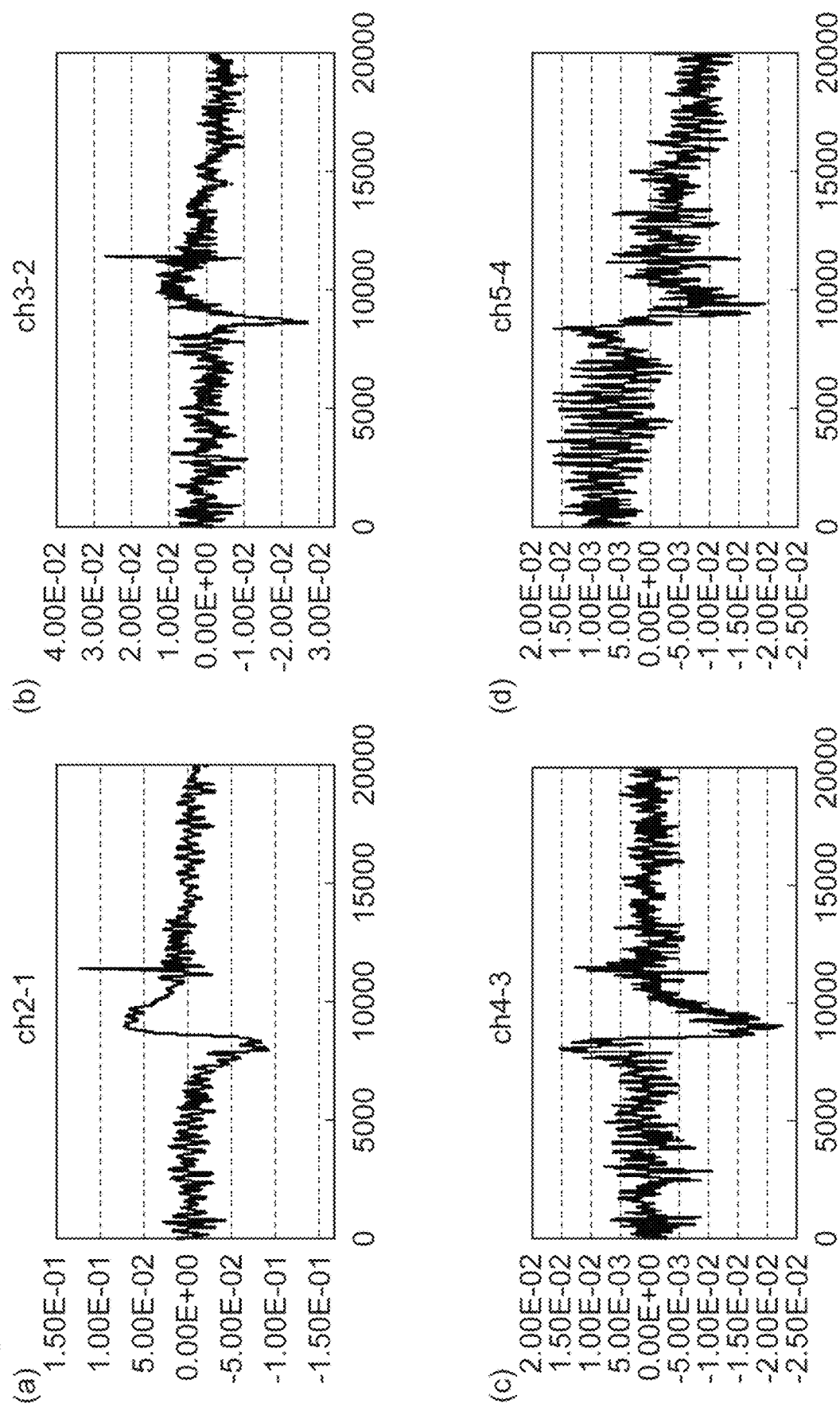
FIG. 3 is a graph illustrating an example of potential difference data.

FIG. 3 illustrates an example of data of the calculated potential difference (an example when the span between potential electrodes 21 is 5 m). Graphs of FIGS. 3(a) to 3(d) are graphs of the pair ch2-ch1, the pair ch3-ch2, the pair ch4-ch3, and the pair ch5-ch4, respectively. In the graph of FIG. 3, a horizontal axis represents a time of measurement (corresponding to each position at which the measurement is performed), and a vertical axis represents the potential difference.

When the resource estimation is performed using the potential difference between the pair of potential electrodes 21 as described above, since a plurality of pairs of potential electrodes 21 are set, the number of potential electrodes 21 provided in the resource estimation system 1 is equal to or greater than three. Further, in order to suppress a drift noise of a measurement value, a potential difference between the respective potential electrodes 21 may be measured while immersing the potential electrodes 21 in seawater or salt water at the same degree as seawater during a sufficient period before estimation of resources is performed, and the potential electrodes 21 with a small individual difference may be paired. The potential difference calculation unit 72 outputs information indicating the potential difference calculated for each pair of potential electrodes 21 to the noise removal unit 73.

The noise removal unit 73 is noise removal means for performing principal component analysis (PCA) or independent component analysis (ICA) using the potentials of the plurality of potential electrodes 21 indicated by the potential information acquired by the estimation information acquisition unit 71 to remove noise contained in the measured potential. The principal component analysis or the independent component analysis can separate predetermined separation components in a mathematical procedure (statistical process), and can be applied to separation of a signal and a noise. For example, the noise removal unit 73 performs extraction of separation components of the signal related to the resources or exclusion of the separation components of the noise from the separation components obtained by performing the principal component analysis or the independent component analysis based on contribution rates or the amount of component loads (the amounts of principal component loads or amounts of independent component loads) of the separation components obtained by the principal component analysis or the independent component analysis, and performs reconstruction of the values of the separation components to calculate the potential from which the noise has been removed.

In the embodiment, the noise removal unit 73 removes the noise contained in the measured potential (separates the signal and the noise) based on the potential differences of the plurality of pairs calculated by the potential difference calculation unit 72. The noise removal unit 73 performs principal component analysis or independent component analysis on the potential differences of the plurality of pairs to remove the noise based on the contribution rate or the amount of component load of the separation components obtained by the analysis.

The noise removal unit 73 may remove noise based also on the environmental information input from the estimation information acquisition unit 71. This is because it is conceivable that the noise changes with an environmental change in the water. Further, the noise removal unit 73 may remove the noise based also on the moving body information input from the estimation information acquisition unit 71. This is because it is conceivable that the noise changes with a change in the state of the moving body 10.

Figure 4:
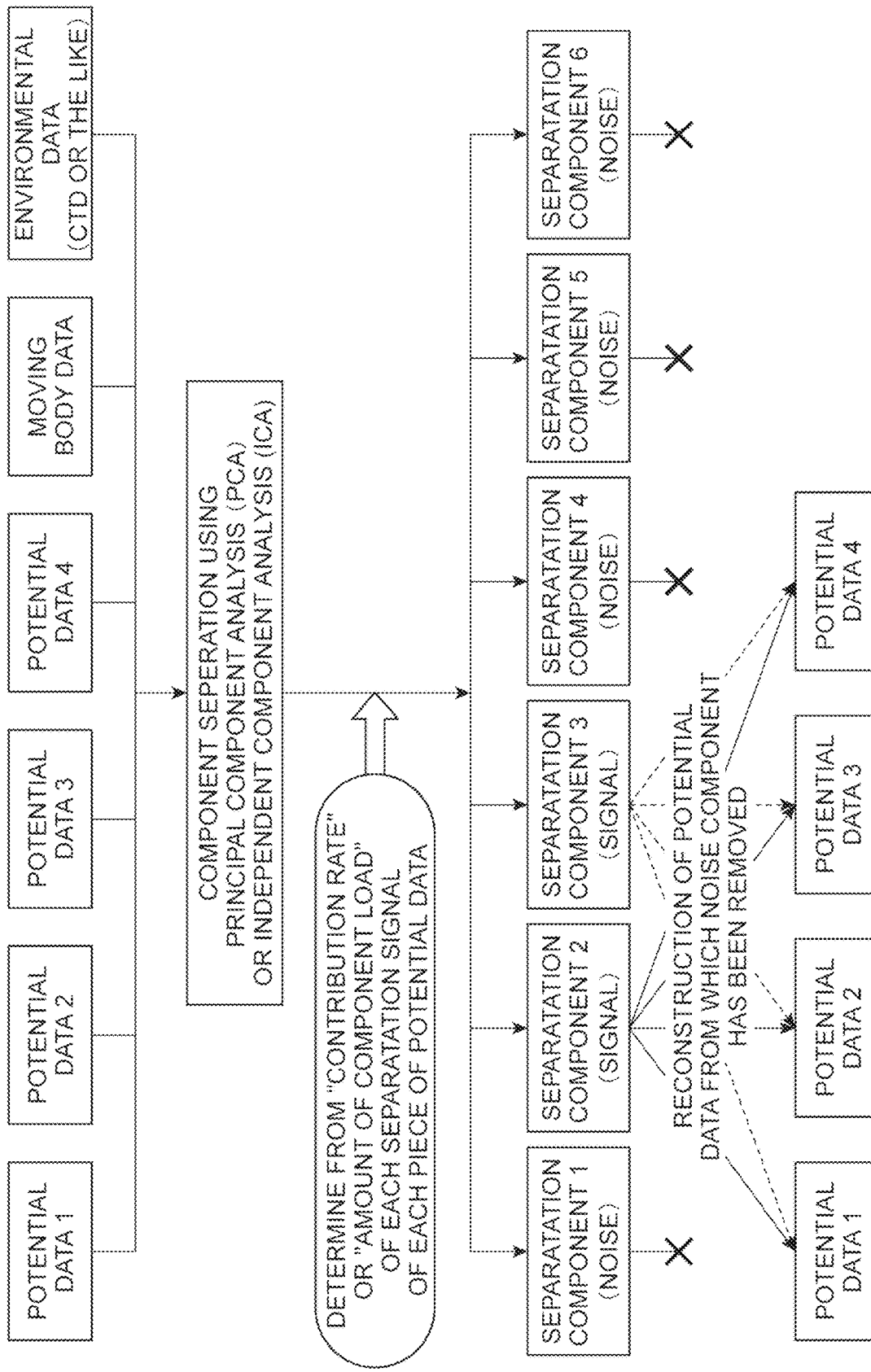
FIG. 4 is a diagram schematically illustrating a method of removing a noise.

Specifically, the noise removal unit 73 removes the noise as follows. FIG. 4 schematically illustrates a method of removing noise using the noise removal unit 73. In FIG. 4, the noise is removed using data of the potential differences of the four pairs of potential electrodes 21, moving body data indicated by the moving body information, and environmental data indicated by the environmental information.

The removal of the noise by the noise removal unit 73 may be performed, for example, in two steps including calibration that is a step of identifying the noise (a preparation step for noise removal) and a step of acquisition of data of the potential difference that is used for estimation of resources by removing noise. That is, a calibration period may be set and the noise removal may be performed. In the calibration, data at an altitude sufficiently distant from the seafloor at which estimation of resources is performed, such as a middle layer (about half of a water depth of a survey sea area) is used. Therefore, in the calibration step, there is no (or extremely little) influence of resources on the potential. That is, in the calibration step, no signal is included (or a signal component is extremely small) in the potential. Therefore, it is conceivable that all of a great fluctuation of data acquired at this time and unique waveforms appearing only in the potential of the individual potential electrode 21 are noises. On the other hand, in the resource estimation, data in the sea at an altitude of about tens of meters from the seafloor is used, as described above. Therefore, the electrometer 30, the environment sensor 50, and the moving body sensor 60 acquire respective pieces of data at the water depth corresponding to each step. That is, the estimation information acquisition unit 71 acquires the potential information, the environmental information, and the moving body information for calibration, and the potential information, the environmental information, and the moving body information for estimation of resources.

The noise removal unit 73 performs extraction of the separation component of the signal related to the resources or exclusion of the separation component of the noise based on the potential information, the environmental information, and the moving body information for calibration, and performs reconstruction of the value of the separation component based on the potential information, the environmental information, and the moving body information for estimation of resources. Specifically, the noise removal unit 73 has the following functions.

First, the function of the noise removal unit 73 in the calibration will be described. The noise removal unit 73 performs principal component analysis or independent component analysis on the data of the potential difference input from the potential difference calculation unit 72, the moving body data indicated by the moving body information, and the environmental data indicated by the environmental information, to obtain information (information for converting a coordinate axis, such as a coefficient vector) for calculating a separation component (a principal component or an independent component) from the original data. Further, the noise removal unit 73 obtains at least one of the contribution rate and the amount of component load (the amount of principal component load or the amount of independent component load) for each separation component. The principal component analysis or the independent component analysis is performed with a pair of potential differences, an item of moving body data, and an item of environmental data as coordinate axes. When the number of pieces of data of the moving body information and the environmental information is different from the number of pieces of data of the potential difference, the numbers of pieces of data are matched by performing data interpolation or the like.

Figure 5:
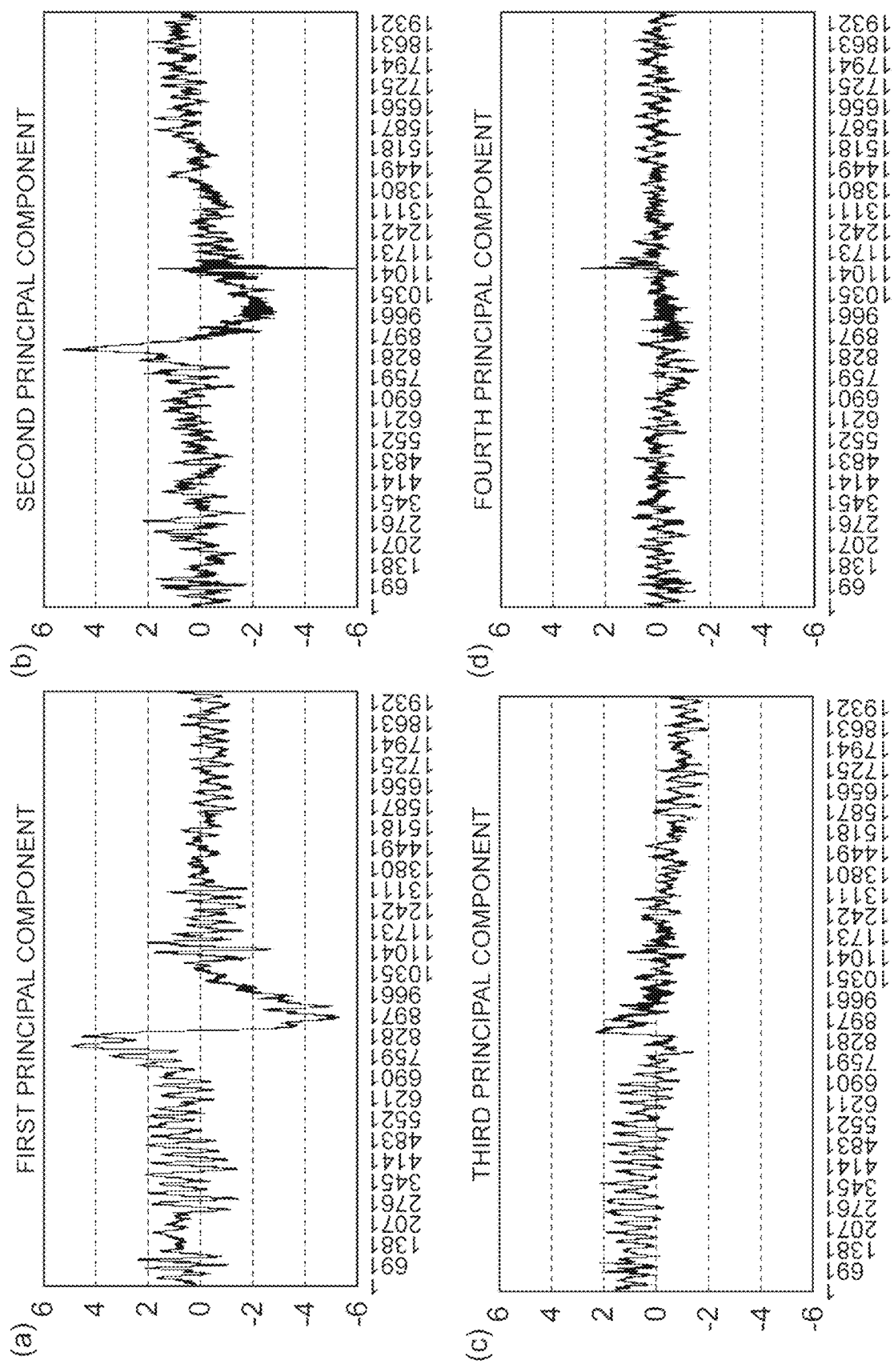
FIG. 5 is a graph illustrating an example of a value of a principal component in principal component analysis.
Figure 6:
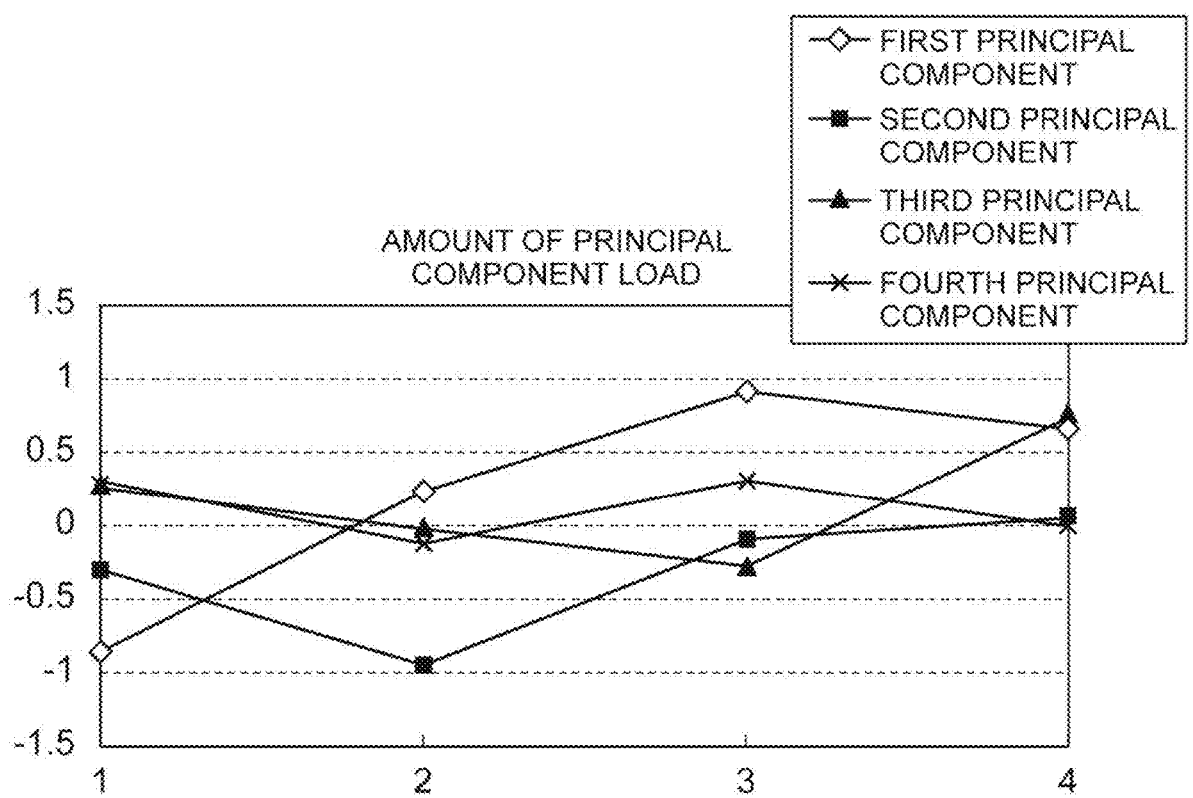
FIG. 6 is a graph illustrating an example of the amount of principal component load in the principal component analysis.
Figure 7:
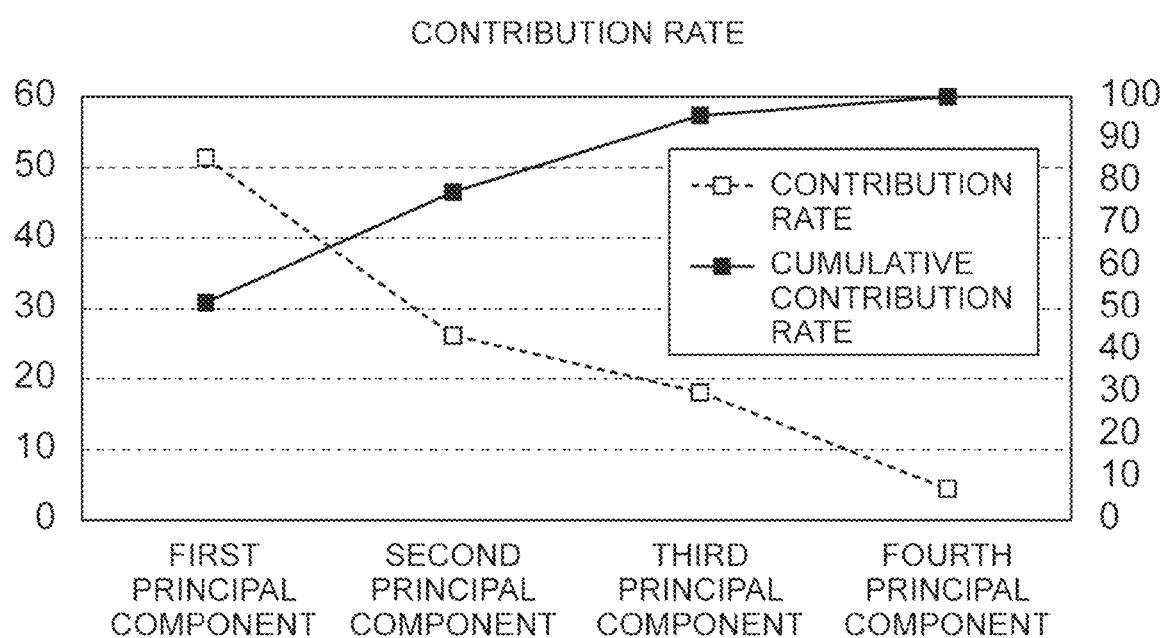
FIG. 7 is a graph illustrating an example of a contribution rate of a principal component in the principal component analysis.

FIGS. 5 to 7 illustrate graphs in an example in which the principal component analysis is performed using the potential difference data illustrated in FIG. 3. In this example, the principal component analysis is performed on the data of potential differences of four pairs (without using moving body data and environmental data). A first principal component, a second principal component, a third principal component, and a fourth principal component are defined in descending order of the contribution rate. Since the principal component analysis uses a pair related to the potential difference as a coordinate axis as described above, the separation components (principal components) can be obtained by the number of pairs (up to the fourth principal component in this example) at maximum.

FIG. 5 illustrates values (principal component scores) of respective principal components. In the graph of FIG. 5, a horizontal axis represents time of measurement (similar to the data of the potential difference in FIG. 3), and a vertical axis represents the value of the principal component. It is not necessary to calculate the value of the principal component in the calibration step. FIG. 6 illustrates the amount of principal component load. In a graph of FIG. 6, a horizontal axis represents a coordinate axis (here, a pair related to the potential difference) of original data which is a target of principal component analysis, 1 indicates a pair ch2-ch1, 2 indicates a pair ch3-ch2, 3 indicates a pair ch4-ch3, and 4 indicates a pair ch5-ch4. A vertical axis represents a value of the amount of principal component load. FIG. 7 illustrates a contribution rate. In a graph of FIG. 7, a horizontal axis represents each principal component, a left vertical axis represents each contribution rate, and a right vertical axis represents a cumulative contribution rate.

Figure 8:
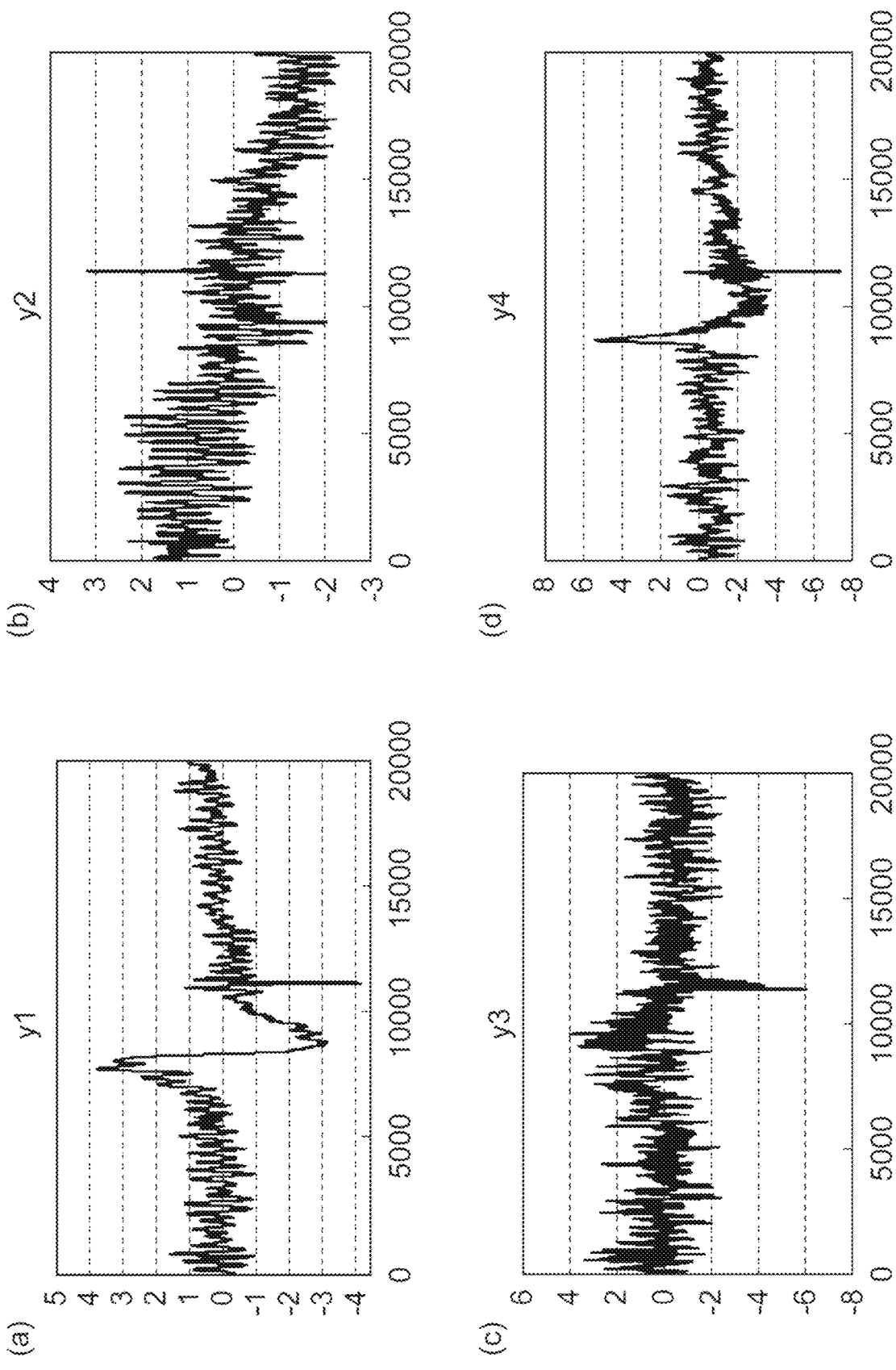
FIG. 8 is a graph illustrating an example of a value of an independent component in independent component analysis.
Figure 9:
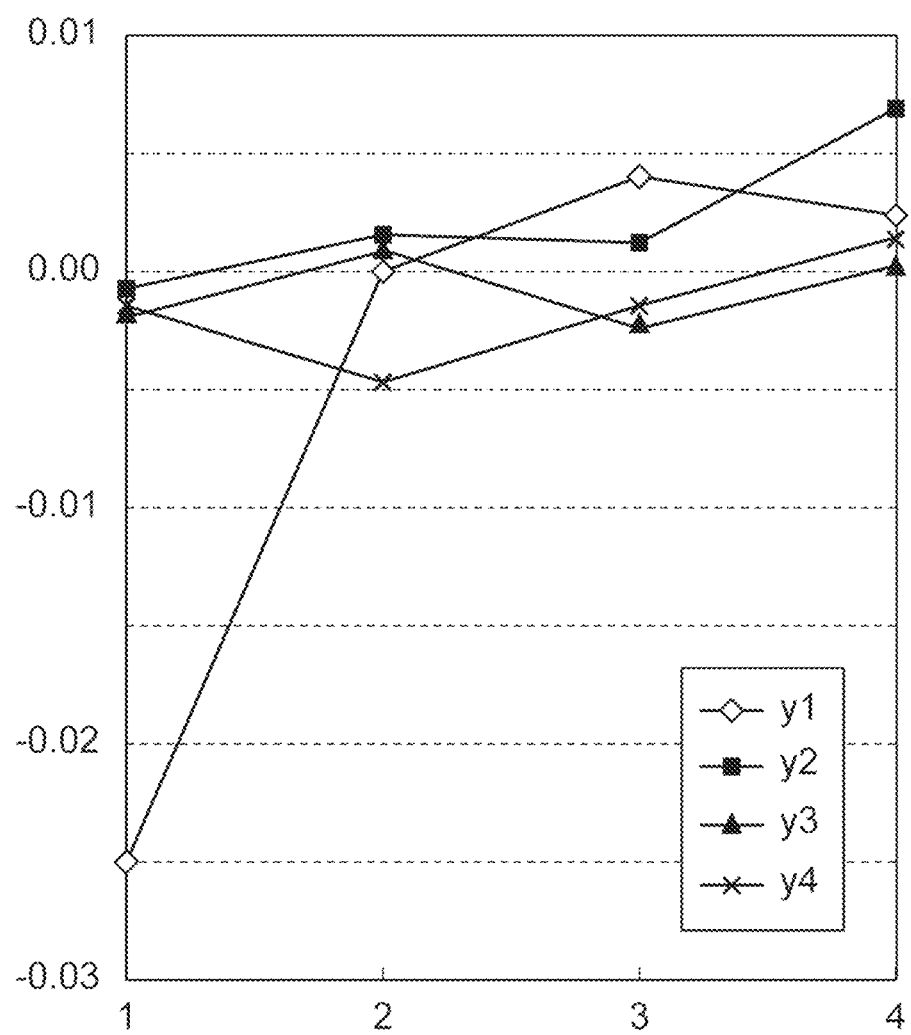
FIG. 9 is a graph illustrating an example of the amount of independent component load in the independent component analysis.

FIGS. 8 and 9 illustrate graphs of an example in which independent component analysis has been performed using the data of the potential difference illustrated in FIG. 3. This example is an example in which the independent component analysis is performed on the data of the potential difference of four pairs (without using the moving body data and the environmental data) as in the case of the above principal component analysis. As described above, since the independent component analysis is performed with a pair related to the potential difference as a coordinate axis, separation components (independent components) can be obtained by the number of pairs at maximum.

FIG. 8 illustrates a value of each independent component. In the graph of FIG. 8, a horizontal axis represents a time of measurement (similar to the data of the potential difference in FIG. 3), and a vertical axis is the value of the independent component. In the calibration step, it is not necessarily required to calculate the value of the independent component. FIG. 9 illustrates the amount of independent component load. In the graph of FIG. 9, a horizontal axis represents a coordinate axis (here, the pair related to the potential difference) of the original data which is a target of the principal component analysis, 1 is a pair ch2-ch1, 2 is a pair ch1-ch2, 3 is a pair ch4-ch3, and 4 is a pair ch5-ch4. The vertical axis is the value of the amount of independent component load.

The noise removal unit 73 extracts a separation component that is used for estimation of resources based on the contribution rate or the amount of component load from the separation components in the principal component analysis or the independent component analysis. The noise removal unit 73 performs extraction of the separation component of the signal related to the resources or exclusion of the separation component of the noise to extract the separation component that is used for estimation of resources. It is conceivable that the signal is related to a far field and the noise is related to a near field. Generally, in the principal component analysis or the independent component analysis, aggregation (selection) of information is performed by discarding separation components of which the amount of component load or the contribution rate (an absolute value in the case of the amount of load) is low. On the other hand, in the embodiment, it is conceivable that the separation component of which the amount of component load or the value of the contribution rate is great is the noise. This is because it conceivable that the noise in the near field has a greater influence on the potential than the far field signal does.

The above extraction is performed based on a determination criterion that is set in the noise removal unit 73 in advance. For example, the extraction is performed as follows. When there are only two pairs related to the potential difference and the moving body data and the environmental data are not used, the separation components are two components. Among the two components, the separation component having a higher contribution rate that is obtained by the principal component analysis or the independent component analysis is regarded as noise, and the other is used as the separation component that is used for estimation of resources.

When there are three or more components (for example, when the number of pairs related to the potential difference is three or more, and the moving body data and the environmental data are used), the components may be used for estimation of the resources, as follows. For example, a variation between the coordinate axes of the obtained amount of component load (between pairs of potential differences, an item of moving body data and an item of environmental data) may be calculated, and separation components that are used for estimation of resources may be extracted based on the variation. When this variation is high, the separation component can be estimated as a noise in a near field. The variation can be obtained as a standard deviation or an average deviation of the amount of component load for each independent component. For example, a preset number of separation components are used for estimation of resources in ascending order of a value of the calculated variation. Alternatively, the separation component of which the calculated variation is equal to or greater than a preset threshold value is regarded as noise, and other separation components are used for estimation of resources.

Alternatively, the obtained contribution rates are integrated in descending order of the contribution rates, and the separation components up to the separation component of which the integrated contribution rate exceeds 70% are regarded as noise, and the other separation components are used for estimation of resources. In this case, the number of separation components that are used for estimation of resources may be set in advance in descending order of contribution rates. Further, when a difference between the contribution rate of the separation component of which the integrated contribution rate exceeds 70% and the immediately previous separation component is equal to or smaller than a preset constant value, the separation components up to the separation component of which the integrated contribution rate exceeds 70% are regarded as noise, and the other separation components are used for estimation of resources. As described above, the noise removal unit 73 determines the separation components of the noise in descending order of contribution rate, and determines the other separation components to be used for estimation of resources. Further, the noise removal unit 73 may determine the separation components of the noise in descending order of the absolute value of the amount of component load, and may determine the other separation components to be used for estimation of resources.

Alternatively, the noise removal unit 73 determines the separation components related to the resources in ascending order of the contribution rate or the absolute value of the amount of component load, and determines the separation components to be used for estimation of resources. For example, the noise removal unit 73 may determine a preset number of separation components in ascending order of the contribution rate or the absolute value of the amount of component load to be the separation components of the signal related to the resources. Specific numerical values are not necessarily limited to those described above and may be determined by tuning. Further, the extraction may be performed according to a determination criterion in which the amount of component load and the contribution rate are combined. Further, since the number of causes of the noise is not one in many cases, better reduction of the noise can be achieved when a large number of components are measured, if possible.

For example, in the case of the amount of principal component load of the principal component analysis illustrated in FIG. 6, since the number of pieces of data is small, an average deviation is calculated as a variation of the amount of principal component load. In this case, the average deviation is 0.5519, 0.3196, 0.3331, 0.1743 in order from the first principal component, and the fourth principal component has the smallest variation. Therefore, the fourth principal component may be used for estimation of resources. In the case of the contribution rate of the principal component analysis illustrated in FIG. 7, a large change in an original time series can be almost described by the principal components up to the second principal component, and the contribution rate exceeds 70%. However, since the variation and the contribution rate are substantially the same between the second principal component and the third principal component, the principal components up to the third principal component may be determined to be noise, and the fourth principal component may be used for estimation of resources.

For example, in the case of the amount of component load of the independent component analysis illustrated in FIG. 9, an average deviation is calculated as a variation of the amount of component load, similar to the case of the principal component analysis. The average deviations are 0.0102, 0.0023, 0.0013, 0.0015 in order from the first component, and the first component (y1) having a high contribution to the potential data of the pair of ch2-ch1 is seen to be very greater than other components. Among the independent components, the components other than the third component (y3) having the smallest variation may be determined to be noise, and the third component (y3) may be used for estimation of resources.

Next, a function of the noise removal unit 73 in a step of removing the noise and acquiring the data of the potential difference that is used for estimation of resources will be described. The noise removal unit 73 calculates a separation component (a value of the principal component and a value of the independent component) from the potential difference data input from the potential difference calculation unit 72, the moving body data indicated by the moving body information, and the environmental data indicated by the environmental information using the information obtained at the time of calibration. In this case, only a separation component extracted as a separation component that is used for estimation of resources may be calculated. The noise removal unit 73 reconstructs the data of the potential difference from only the separation component that is used for estimation of resources (excluding the separation component regarded as noise at the time of calibration). The reconstruction of the data is performed similar to a method according to the principal component analysis or the independent component analysis in the related art. As a result of the reconstruction, data corresponding to the same number of pairs as the original potential difference data can be obtained.

As described above, the data indicated in the environmental information and the moving body information may be handled as a coordinate axis for the principal component analysis or the independent component analysis. However, when the waveform of the potential difference data has a clearly high correlation with the waveform of the data indicated in at least one of the environmental information and the moving body information, and an intensity is high, the waveform itself may be removed by curve fitting or the like.

Figure 10:
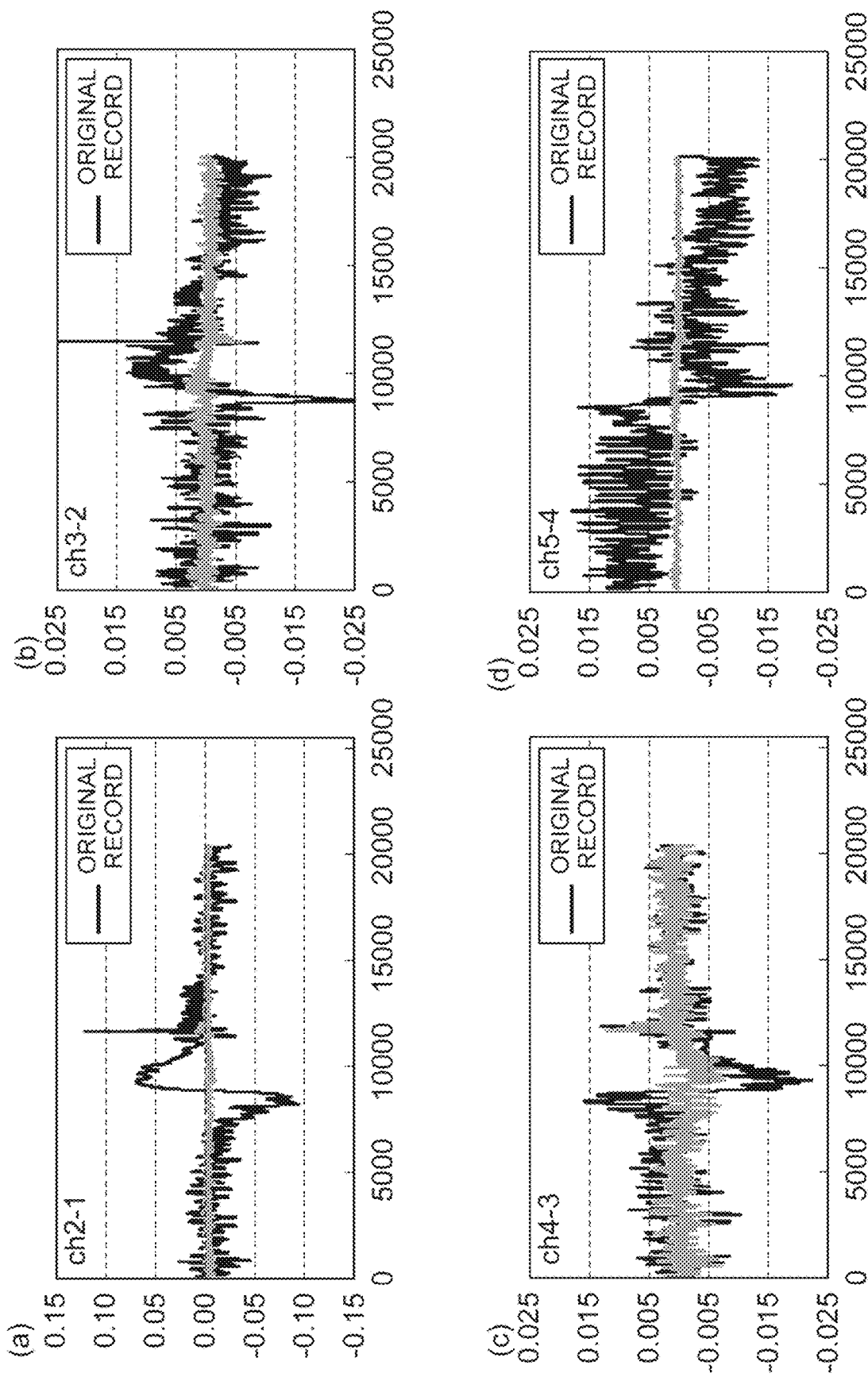
FIG. 10 is a graph illustrating an example of data of a reconstructed potential difference (after noise removal).

FIG. 10 illustrates an example of data of the potential difference in which data is reconstructed from only a third component by performing the independent component analysis illustrated in FIGS. 8 and 9 on the data of the potential difference illustrated in FIG. 3 (components other than the third component have been removed as noise). Further, in FIG. 10, an original waveform is also shown. Thus, sufficient noise reduction is achieved as compared with the original waveform. The noise removal unit 73 outputs the reconstructed data of the potential difference (a waveform of the potential difference) to the resource estimation unit 74.

The resource estimation unit 74 is resource estimation means for estimating the presence of resources based on the potential from which the noise has been removed by the noise removal unit 73. The resource estimation unit 74 estimates which portion under the seafloor resources are present based on the potential and the position information corresponding to the potential input from the estimation information acquisition unit 71. Specifically, the resource estimation unit 74 estimates an underground structure (potential distribution at an underground) best describing the signal with respect to a spatial distribution of a signal (a waveform of the potential difference) obtained by the measurement, as estimation of resources. This estimation may be performed similarly to exploration of resources based on a self-potential in the related art. Further, the resource estimation unit 74 may perform the estimation by performing analysis integrally with survey data other than the above-described data such as a potential in the sea. The resource estimation unit 74 outputs information indicating the estimation result (for example, information indicating the potential distribution at the underground) to the output unit 75.

The output unit 75 is output means for outputting the information indicating the estimation result from the resource estimation unit 74. The output unit 75 outputs the information by transmitting the information to another device (for example, a device on the ship 100), for example. Alternatively, after the moving body 10 is pulled up over the sea, the output unit 75 may perform output such as a display of the information so that the user can recognize the information. The above is a configuration of the resource estimation system 1 according to the embodiment.

Figure 11:
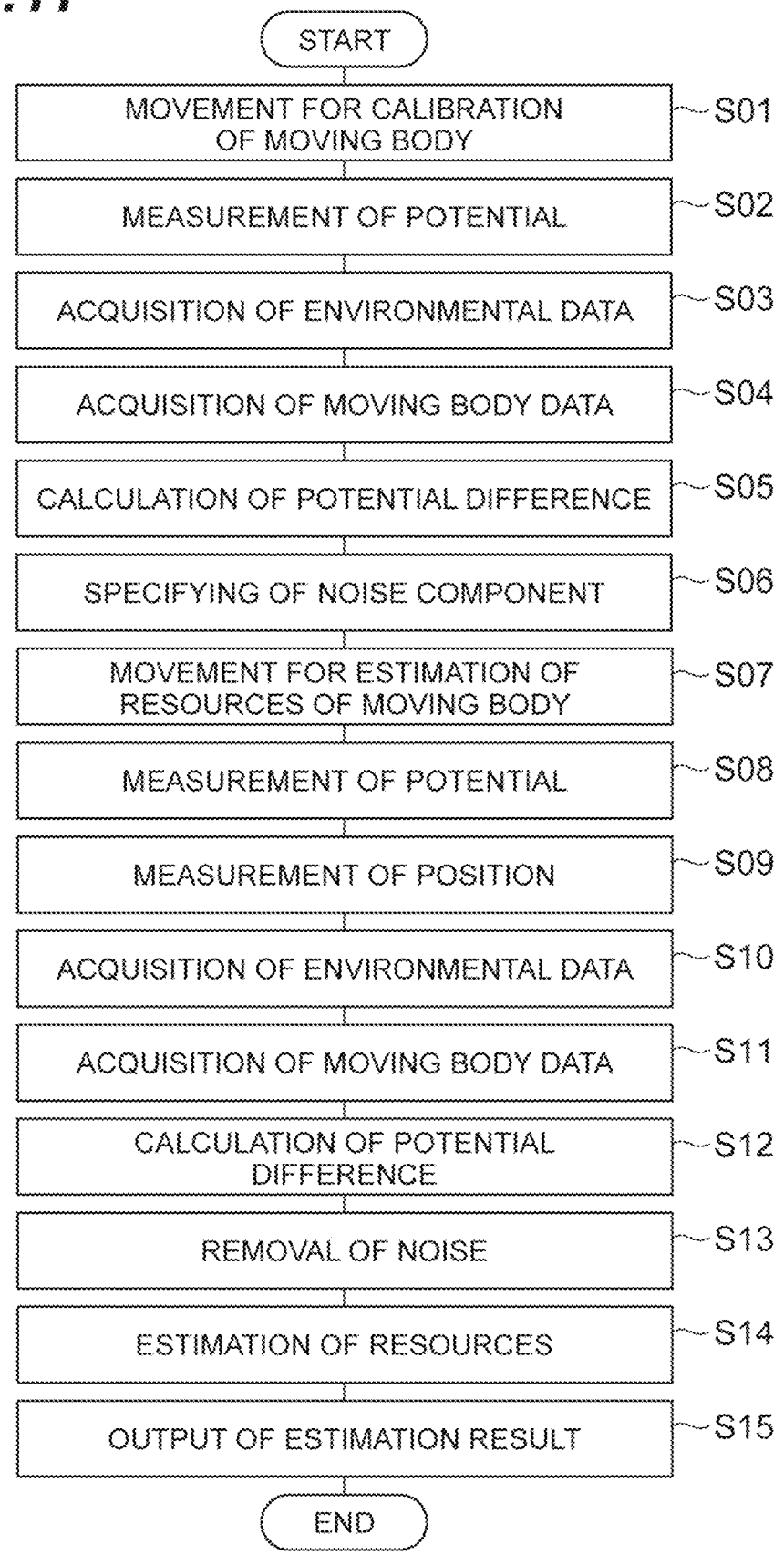
FIG. 11 is a flowchart illustrating a resource estimation method which is a process that is executed in the resource estimation system according to the embodiment of the present invention.

Subsequently, a resource estimation method which is a process (an operation method in the resource estimation system 1) that is executed in the resource estimation system 1 according to the embodiment will be described with reference to the flowchart of FIG. 11. In this process, first, the resource estimation system 1 is moved by the ship 100 or the like in a sea area in which estimation of resources is performed, and is sunk in the sea. Subsequently, when the resource estimation system 1 reaches a middle layer, the resource estimation system 1 performs movement for calibration (S01; a movement step). According to this movement, the electrodes 20 and 21 also move in the sea. The following processes (S02 to S04) are continuously performed during the movement. Further, the movement is performed for a predetermined period.

During this movement, the electrometer 30 measures the potential of each potential electrode 21. The potential information obtained by the measurement is input from the electrometer 30 to the computer 70 and is acquired by the estimation information acquisition unit 71 (S02; a potential measurement step and a potential information acquisition step). The potential information acquired by the estimation information acquisition unit 71 is output to the potential difference calculation unit 72.

Further, the environment sensor 50 detects an underwater environment (environmental data). The environmental information obtained by the detection is input from the environment sensor 50 to the computer 70 and is acquired by the estimation information acquisition unit 71 (S03; an environmental information acquisition step). The environmental information acquired by the estimation information acquisition unit 71 is output to the noise removal unit 73.

Further, the state (moving body data) of the moving body 10 is detected by the moving body sensor 60. The environmental information obtained by the detection is input from the moving body sensor 60 to the computer 70 and is acquired by the estimation information acquisition unit 71 (S04; a moving body information acquisition step). The moving body information acquired by the estimation information acquisition unit 71 is output to the noise removal unit 73.

Subsequently, the potential difference calculation unit 72 calculates the potential difference between the pair of potential electrodes 21 at the plurality of positions for measurement for the potentials of the potential electrodes 21 indicated by the input potential information, for the plurality of pairs (S05; a potential difference calculation step). Information indicating the calculated potential difference for each pair is output from the potential difference calculation unit 72 to the noise removal unit 73.

Subsequently, the noise removal unit 73 performs the calibration process using the information input from the potential difference calculation unit 72 and the information input from the estimation information acquisition unit 71 (S06; a noise removal step). Specifically, principal component analysis or independent component analysis is performed on data indicated by the information. Subsequently, the separation components that are used for estimation of resources among the separation components obtained by the analysis are extracted (separation components corresponding to noise are specified and removed).

The above is a calibration process. Subsequently, a resource estimation process is performed. The resource estimation system 1 moves to a water depth at which a self-potential caused by resources is generated (for example, an altitude of about tens of meters from the seafloor). Subsequently, the resource estimation system 1 performs movement for estimation of resources, that is, movement in a horizontal direction (S07; a movement step). Similar to the above, the electrodes 20 and 21 also move in the sea according to the movement. In this case, the electrodes 20 and 21 may move while maintaining a constant altitude from a seafloor, or may move at a substantially constant water depth (maintaining a constant water depth from a sea surface). Further, the following processes (S08 to S11) are continuously performed during the movement. Further, the movement is performed over an area in the sea that is a resource estimation target.

During this movement, the electrometer 30 measures the potential of each potential electrode 21. The potential information obtained by the measurement is input from the electrometer 30 to the computer 70 and is acquired by the estimation information acquisition unit 71 (S08; a potential measurement step and a potential information acquisition step). The potential information acquired by the estimation information acquisition unit 71 is output to the potential difference calculation unit 72.

Further, the position of the moving body 10 is measured by the positioning device 40. The position information obtained by the detection is input from the positioning device 40 to the computer 70 and acquired by the estimation information acquisition unit 71 (S09). The position information acquired by the estimation information acquisition unit 71 is output to the resource estimation unit 74.

Further, the environment sensor 50 detects an underwater environment (environmental data). The environmental information obtained by the detection is input from the environment sensor 50 to the computer 70 and is acquired by the estimation information acquisition unit 71 (S10; an environmental information acquisition step). The environmental information acquired by the estimation information acquisition unit 71 is output to the noise removal unit 73.

Further, a state (moving body data) of the moving body 10 is detected by the moving body sensor 60. The environmental information obtained by the detection is input from the moving body sensor 60 to the computer 70 and is acquired by the estimation information acquisition unit 71 (S11; a moving body information acquisition step). The moving body information acquired by the estimation information acquisition unit 71 is output to the noise removal unit 73.

Subsequently, the potential difference calculation unit 72 calculates the potential difference between the pair of potential electrodes 21 for a plurality of positions for measurement for the potentials of the potential electrodes 21 indicated by the input potential information, for a plurality of pairs (S12; a potential difference calculation step). Information indicating the calculated potential difference for each pair is output from the potential difference calculation unit 72 to the noise removal unit 73.

Subsequently, the noise removal unit 73 uses the information on the separation components that is used for estimation of resources extracted in S06 to calculate values of the separation components (principal component scores or values of the independent components) of the information input from the potential difference calculation unit 72 and the information input from the estimation information acquisition unit 71. Subsequently, the values of the separation components are reconstructed, and data of the potential difference from which the noise has been removed is acquired (S13; a noise removal step). The reconstructed potential difference data is output from the noise removal unit 73 to the resource estimation unit 74.

Subsequently, based on the reconstructed potential difference data input from the noise removal unit 73 and the position information corresponding to the potential input from the estimation information acquisition unit 71, the resource estimation unit 74 estimates which portion under the seafloor the resources exist (S14; a resource estimation step). Information indicating a result of the estimation is output from the resource estimation unit 74 to the output unit 75. Subsequently, the output unit 75 outputs the information indicating the estimation result from the resource estimation unit 74 (S15; an output step). The above is a process that is executed by the resource estimation system 1 according to the embodiment.

In the description of the above process, the operations (S02 to S04 and S08 to S11) of the respective devices 30, 40, 50, and 60 and the processes (505, S06, and 512 to S15) in the computer 70 are alternately performed. However, since the process in the computer 70 is possible even after all the operations of the respective devices 30, 40, 50, and 60 end, the processes may be performed in such order.

In the embodiment, the noise contained in the potential is removed based on the potential differences between the pairs of the plurality of potential electrodes 21 having a predetermined positional relationship, and the presence of the resources in the seafloor is estimated. By performing the principal component analysis or the independent component analysis using the potential differences of the plurality of potential electrodes 21, it is possible to separate a potential of near field noise from the potential caused by the resources in the seafloor in the far field. Thereby, according to the embodiment, it is possible to accurately perform exploration of resources at the bottom of water such as the seafloor based on the self-potential. Further, since the method according to the embodiment measures the self-potential, the method can be realized by easy analysis without requiring advanced observation equipment as compared with a method using an active source.

Further, as described above, the noise may be removed based on the contribution rate or the amount of component load of the separation component. According to this configuration, it is possible to accurately perform exploration of resources at the bottom of water such as the seafloor or the like based on the self-potential appropriately and reliably.

Further, as in the embodiment, information may be acquired in two steps including calibration (a process when the signal is not included in the potential) and estimation of resources (a process when the signal is included in the potential) and noise may be removed. According to this configuration, the noise can be more appropriately removed, and exploration of resources at the bottom of water can be performed more accurately. However, the acquisition and the processing of data are not necessarily performed in two steps, and the removal of the noise may be performed using only data that is used for estimation of resources (for example, data in the sea at an altitude of about tens of meters from the seafloor, as described above).

Further, the noise may be removed using the environmental information, as in the embodiment. According to this configuration, the noise can be removed in reliable consideration of the underwater environment, and exploration of resources at the bottom of water can be performed more accurately.

Further, the noise may be removed using the moving body information, as in the embodiment. According to this configuration, it is possible to remove noise in reliable consideration of the state of the moving body 10, and to perform exploration of the resources at the bottom of water more accurately. However, a configuration in which the moving body information is not used may be adopted.

Further, the moving body 10 and the electrodes 20 and 21 may be moved at a substantially constant water depth, as described above. According to this configuration, it is possible to easily move the moving body 10 and the electrodes 20 and 21 in water such as in the sea, and thus it is possible to easily implement an embodiment of the present invention.

In the above-described embodiment, it is assumed that the computer 70 that performs calculation for estimating the presence of resources is included in the moving body 10. However, the computer 70 does not necessarily have to be included in the moving body 10, and a configuration in which information can be acquired from the respective devices 30, 40, 50, and 60 included in the moving body 10 may be adopted. For example, the computer 70 may be included in the ship 100, a ground base, or the like. Further, the resource estimation system according to the present invention may include only the computer 70 described above since the information may be obtained by the respective devices 30, 40, 50, and 60.

Further, in the resource estimation system 1 described above, the electrodes 20 and 21 are connected by the electrode rod 22 and are arranged at positions away from the moving body 10. However, the electrodes 20 and 21 may be connected directly to the moving body 10.

Figure 12:
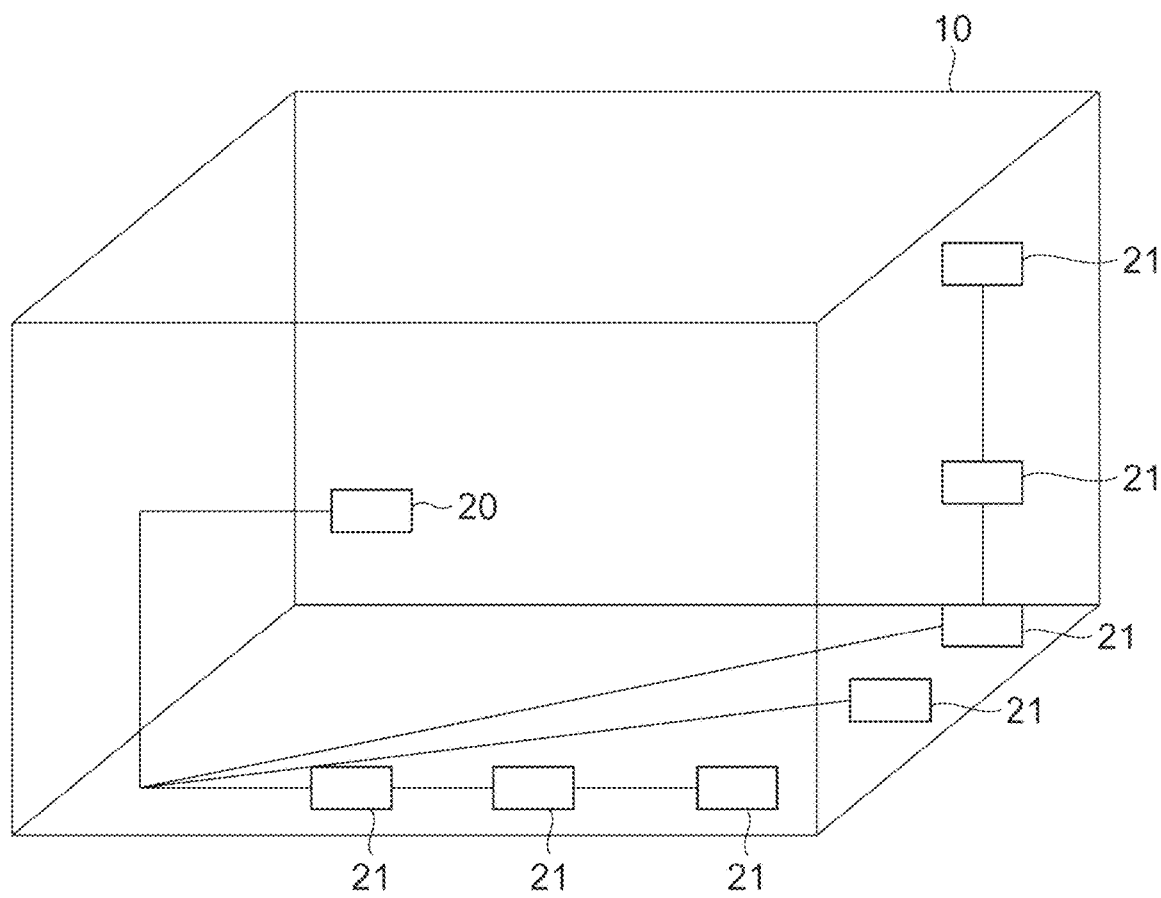
FIG. 12 is a diagram illustrating a modification example of arrangement of electrodes.

For example, the electrodes 20 and 21 may be arranged at different positions such as a side surface and a bottom surface of the moving body 10, as illustrated in FIG. 12.

According to this configuration, for example, the electrodes 20 and 21 can be arranged at different positions in a large number of directions such as not only the direction of the electrode rod 22 as illustrated in FIG. 1, but also a horizontal direction and a vertical direction. That is, the respective electrodes 20 and 21 can be three-dimensionally arranged. Thereby, it is possible to arrange the electrodes 20 and 21 so that it is easy to detect noise, and it is possible to accurately perform exploration of resources at the bottom of water.

In the embodiment, the potential that is a noise removal target and is used for estimation of resources is the potential difference between each pair of potential electrodes 21. However, in the present invention, the potential that is used for estimation of resources is not limited to the potential difference between the pair. For example, the potential may be the potentials of the plurality of potential electrodes 21 with respect to the potential of the common electrode 20 (the potential difference between the potential of the common electrode 20 and the potential of the potential electrode 21).

Figure 13:
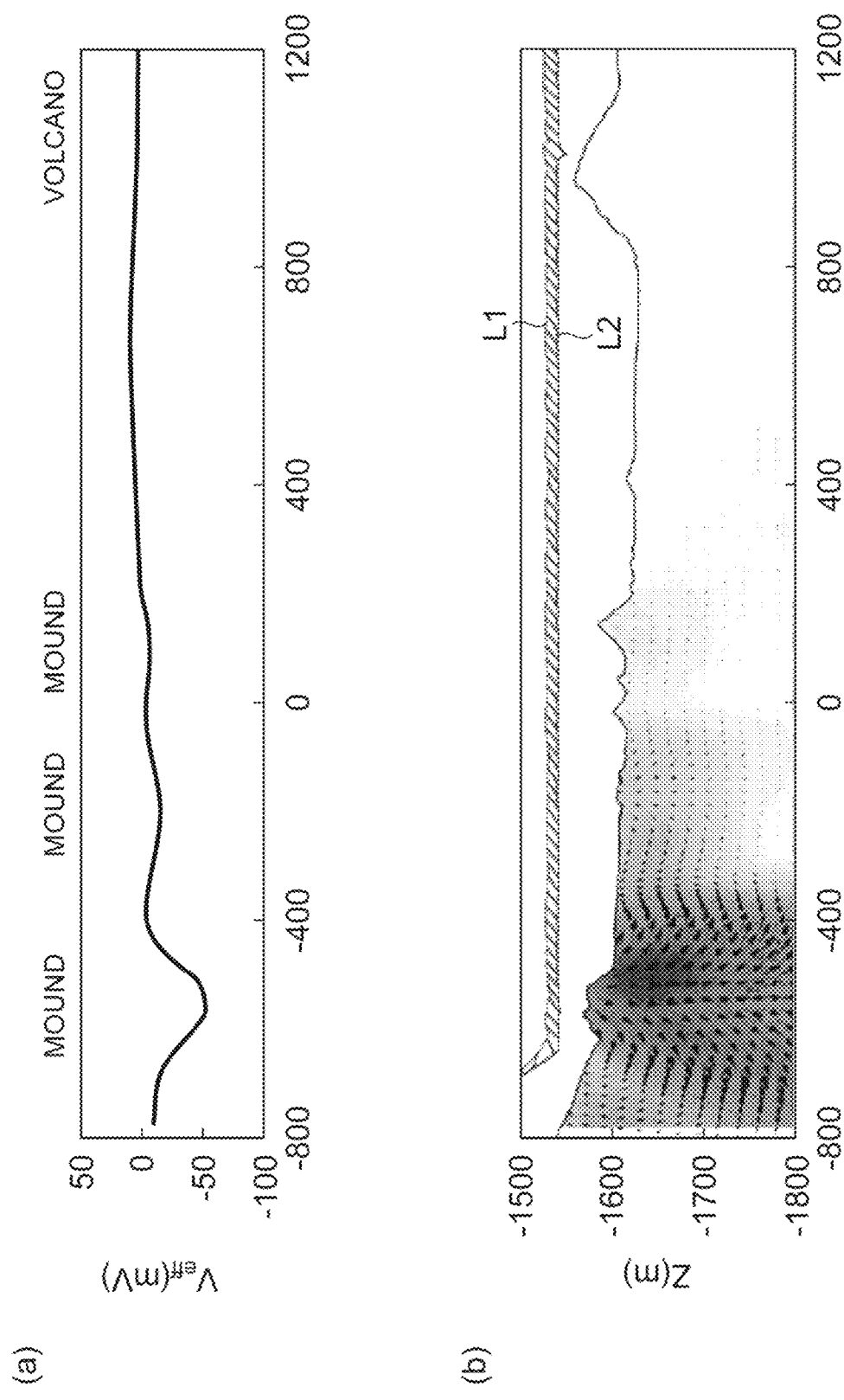
FIG. 13 is a diagram illustrating an example of estimation of resources in the seafloor.
Figure 14:
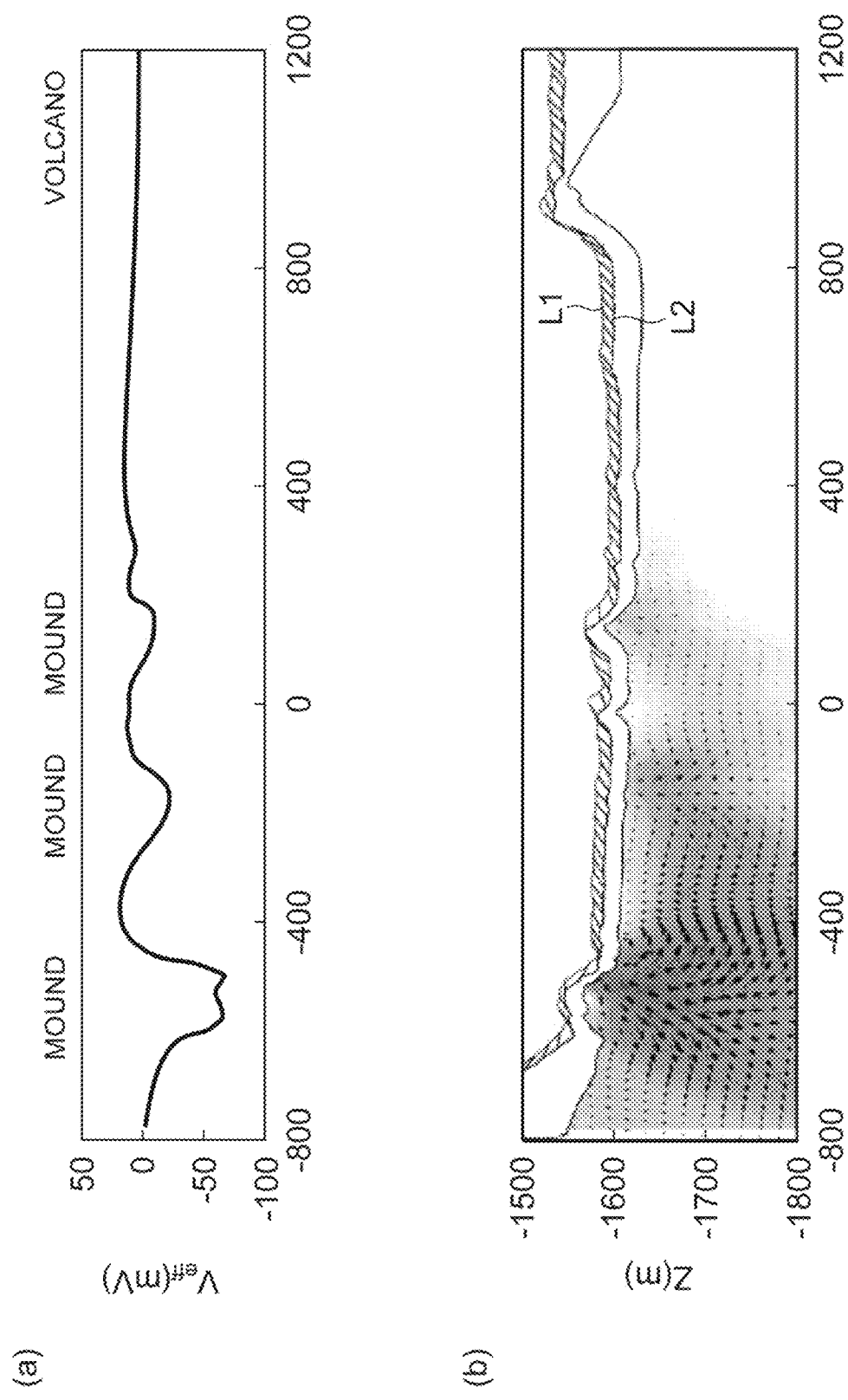
FIG. 14 is a diagram illustrating an example of estimation of resources in the seafloor.
Figure 15:
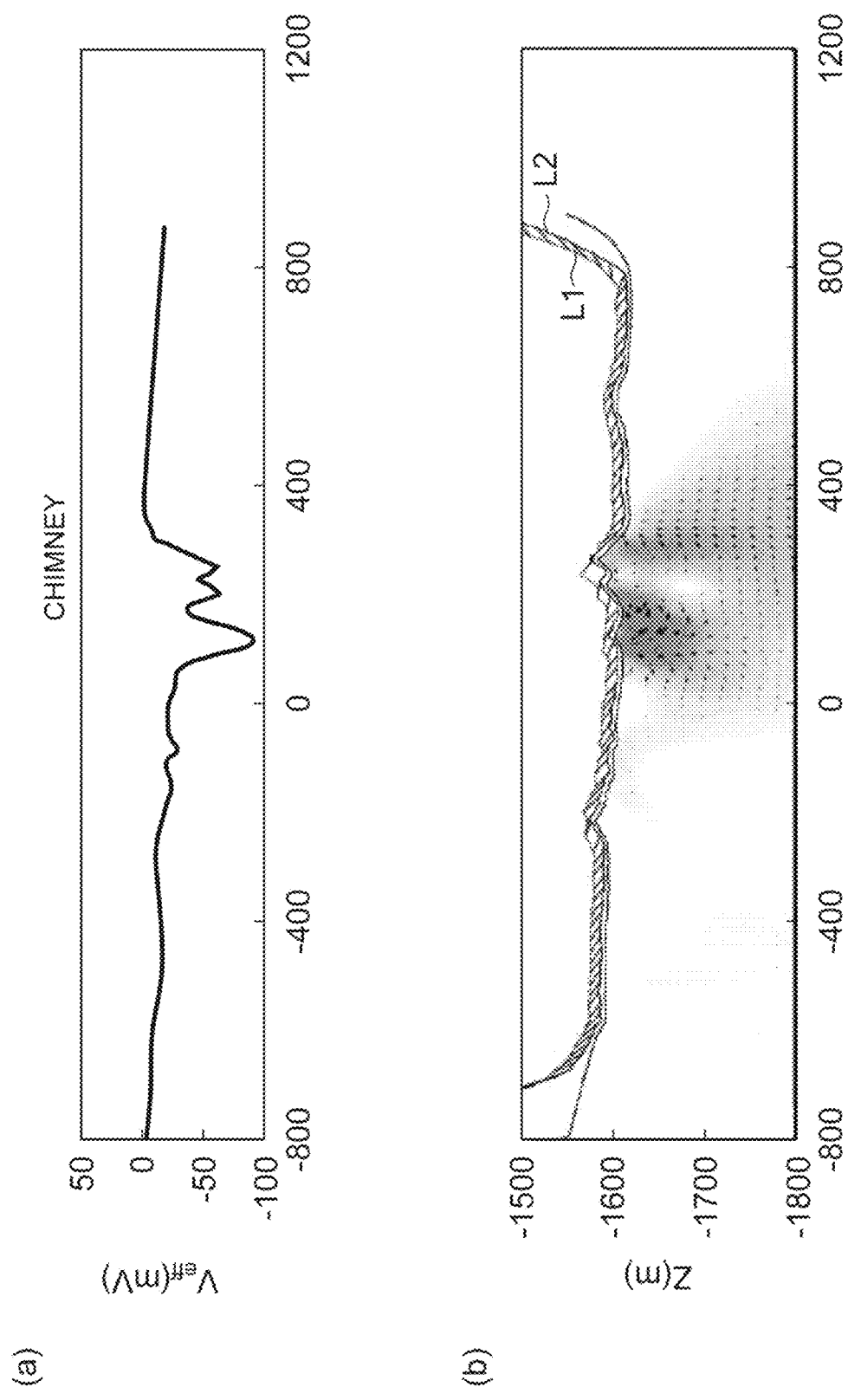
FIG. 15 is a diagram illustrating an example of estimation of resources in the seafloor.

Subsequently, FIGS. 13 to 15 illustrate examples of actual estimation of resources in the seafloor. FIGS. 13(a), 14(a), and 15(a) are graphs showing one of pieces of data of the potential difference related to the signal (to be exact, data obtained by integrating the potential difference along a route). In these graphs, a horizontal axis represents a measurement position and a vertical axis represents the data of the potential difference related to the signal (to be exact, data obtained by integrating the potential difference along the route). FIGS. 13(b), 14(b), and 15(b) are diagrams illustrating estimated resources based on the data of FIGS. 13(a), 14(a) and 15(a). In FIGS. 13(b), 14(b), and 15(b), a horizontal axis represents a position (corresponding to the position of the graphs in FIGS. 13(a), 14(a) and 15(a)), and a vertical axis represents a depth from a sea surface. A dark color portion is a portion in which resources are estimated to be present. Further, in FIGS. 13(b), 14(b), and 15(b), a water depth L1 of the moving body and a water depth L2 of a distal end on the side opposite to the side of the electrode rod 22 connecting the electrodes 20 and 21 connected to the moving body 10 are shown.

In this estimation example, the estimation in a sulfide mound group is performed, and FIGS. 13 and 14 illustrate the same seafloor. In FIGS. 13 and 14, the mound is an area with signs of hot water, and a volcano is an area indicating a trace of a volcanic activity at the time of formation of caldera-like terrain. In FIG. 15, a chimney indicates a mound with signs of hot water, and no signs of hot water is indicated in an abnormal area in front of the chimney (left side in the figure). It can be seen that in an abnormal area with no signs of hot water, an ore deposit is formed, that is, a blind ore deposit can be detected as illustrated in FIG. 15(b). In exploration of submarine mineral resources, finding the blind ore deposit is a big issue and the present invention is effective against a solution of the issue. It can be seen from this that the estimation according to the embodiment of the present invention can be appropriately performed. Further, when the moving body is caused to move at a constant depth from the bottom of the sea as illustrated in FIG. 14, a distance up to the resources is shorter than that when the moving body is caused to move at a substantially constant water depth as illustrated in FIG. 13. Accordingly, it is possible to perform finer estimation.

REFERENCE SIGNS LIST

1 Resource estimation system
10 Moving body
20 Common electrode
21 Potential electrode
22 Electrode rod
30 Electrometer
40 Positioning device
50 Environment sensor
60 Moving body sensor
70 Computer
71 Estimation information acquisition unit
72 Potential difference calculation unit
73 Noise removal unit
74 Resource estimation unit
75 Output unit
100 Ship
101 Cable

The invention claimed is:

1. A resource estimation system comprising circuitry configured to:

acquire potential information indicating potentials of a plurality of electrodes having a predetermined positional relationship measured at a plurality of positions in water, the potentials depending to an electric field generated in water by resources in the bottom of water;

perform principal component analysis or independent component analysis using the potentials of the plurality of electrodes indicated by the potential information to remove a noise contained in the measured potentials; and estimate the presence of resources in the bottom of water based on the potential from which the noise has been removed, wherein the circuitry performs extraction of a separation component of a signal related to the resources or exclusion of separation components of the noise from separation components obtained by performing the principal component analysis or the independent component analysis based on a contribution rate or the amount of component load of the separation component obtained by the principal component analysis or the independent component analysis, and performs reconstruction of values of the separation components to calculate the potential from which the noise has been removed.

2. The resource estimation system according to claim 1, wherein the circuitry determines the separation component of the noise in descending order of the contribution rate or an absolute value of the amount of component load.

3. The resource estimation system according to claim 1, wherein the circuitry determines the separation component of the signal related to the resources in ascending order of the contribution rate or an absolute value of the amount of component load.

4. The resource estimation system according to claim 1, wherein the circuitry acquires potential information for calibration and potential information for estimation of resources, and performs extraction of the separation component of the signal related to the resources or exclusion of the separation component of the noise based on the potential information for calibration, and performs reconstruction of a value of the separation component based on the potential information for estimation of resources.

5. The resource estimation system according to claim 1, wherein the circuitry acquires environmental information indicating an environment at a plurality of positions in the water, and removes the noise based also on the environmental information.

6. The resource estimation system according to claim 1, further comprising:

the plurality of electrodes; and an electrometer configured to measure the potential of the electrodes at a plurality of positions in water and inputting potential information indicating the measured potential to the circuitry.

7. The resource estimation system according to claim 6, further comprising:

a moving body that moves in water, wherein the plurality of electrodes are arranged at different positions of the moving body.

8. The resource estimation system according to claim 1, wherein the circuitry acquires moving body information indicating a state of a moving body to which a plurality of electrodes are connected and that moves in the water at a plurality of positions in the water, and removes the noise based also on the moving body information.

9. A resource estimation method in an operation method of a resource estimation system, the resource estimation method comprising:

a potential information acquisition step of acquiring potential information indicating potentials of a plurality of electrodes having a predetermined positional relationship measured at a plurality of positions in water, the potentials depending to an electric field generated in water by resources in the bottom of water;

a noise removal step of performing principal component analysis or independent component analysis using the potentials of the plurality of electrodes indicated by the potential information acquired in the potential information acquisition step to remove noise contained in the measured potentials;

a resource estimation step of estimating the presence of resources in the bottom of water based on the potential from which the noise has been removed in the noise removal step; and a step of extracting a separation component of a signal related to the resources or exclusion of separation components of the noise from separation components obtained by performing the principal component analysis or the independent component analysis based on a contribution rate or the amount of component load of the separation component obtained by the principal component analysis or the independent component analysis, and performing reconstruction of values of the separation components to calculate the potential from which the noise has been removed.

10. The resource estimation method according to claim 9, further comprising:

a movement step of moving the electrodes at a constant water depth.

* * * * *